(12) United States Patent
Nakajima et al.

(10) Patent No.: US 7,434,857 B2
(45) Date of Patent: Oct. 14, 2008

(54) CHUCK DEVICE OF CONTAINER, TRANSPORTATION DEVICE WITH THE SAME, AND CHUCK CLAW FOR THE TRANSPORTATION DEVICE

(75) Inventors: Kiyoharu Nakajima, Yokohama (JP); Kunihiko Kubota, Yokohama (JP); Keiichi Fujimoto, Yokohama (JP); Kazuhiro Horiuchi, Yokohama (JP)

(73) Assignee: Kirin Techno-System Corporation, Kanagawa (JP)

( * ) Notice: Subject to any disclaimer, the term of this patent is extended or adjusted under 35 U.S.C. 154(b) by 228 days.

(21) Appl. No.: 10/540,813

(22) PCT Filed: Dec. 26, 2003

(86) PCT No.: PCT/JP03/17045

§ 371 (c)(1),
(2), (4) Date: Jun. 22, 2005

(87) PCT Pub. No.: WO2004/060779

PCT Pub. Date: Jul. 22, 2004

(65) Prior Publication Data

US 2006/0042911 A1    Mar. 2, 2006

(30) Foreign Application Priority Data

Dec. 27, 2002    (JP)    ............................. 2002-381776
Dec. 27, 2002    (JP)    ............................. 2002-382270

(51) Int. Cl.
*B65G 47/86* (2006.01)
(52) U.S. Cl. ..................................... 294/116
(58) Field of Classification Search ............. 294/93–97, 294/99, 110.2, 116
See application file for complete search history.

(56) References Cited

U.S. PATENT DOCUMENTS

| | | | | | |
|---|---|---|---|---|---|
| 4,304,433 | A | * | 12/1981 | Langowski | ................. 294/106 |
| 4,647,099 | A | * | 3/1987 | Berry et al. | .............. 294/103.1 |
| 4,744,596 | A | * | 5/1988 | Hiller et al. | ................... 294/88 |
| 5,224,122 | A | * | 6/1993 | Bruckert | ...................... 294/88 |
| 5,284,375 | A | * | 2/1994 | Land, III | ..................... 294/88 |
| 5,409,280 | A | * | 4/1995 | Hill | ............................. 294/16 |
| 5,609,457 | A | * | 3/1997 | Burns | ...................... 414/22.51 |
| 5,702,139 | A | * | 12/1997 | Buck | .......................... 294/88 |
| 5,893,700 | A | * | 4/1999 | Kronseder | .............. 414/744.2 |

(Continued)

OTHER PUBLICATIONS

Patent Abstracts of Japan for JP10-250838 published Sep. 22, 1998.

(Continued)

*Primary Examiner*—Douglas A Hess
(74) *Attorney, Agent, or Firm*—Darby & Darby P.C.

(57) ABSTRACT

A chuck device having a pair of arms rotatably supported by arm shafts and an operation member. One of the arms is provided with a roller shaft rotatable together with the arm about one of the arm shafts. The other arm is provided with an arm drive portion rotatable together with the arm. The arm drive portion is biased so as to press a second roller. Between the operation member and the roller shaft is provided a motion input mechanism for converting the motion of the operation member to rotational motion of the roller shaft about the arm shaft as the center of rotation. Between the roller shaft and the arm drive portion is provided an interlock mechanism that causes the arm drive portion to rotate about the arm shaft in conjunction with the motion of the roller shaft about the arm shaft as the center of rotation.

13 Claims, 21 Drawing Sheets

U.S. PATENT DOCUMENTS 5,904,075 A * 5/1999 Buck .......................... 81/57.18
6,138,529 A * 10/2000 Pietras ....................... 81/57.33
7,125,059 B2 * 10/2006 Miyamoto ................. 294/106

OTHER PUBLICATIONS

Patent Abstracts of Japan for JP2001-233448 published Aug. 28, 2001.
Patent Abstracts of Japan for JP2001-315957 published Nov. 13, 2001.
Patent Abstracts of Japan for JP11-106039 published Apr. 20, 1999.
Patent Abstracts of Japan for JP10-007243 published Jan. 13, 1998.
International Search Report for PCT/JP2003/017045 mailed Apr. 20, 2004.

* cited by examiner

CHUCK DEVICE OF CONTAINER, TRANSPORTATION DEVICE WITH THE SAME, AND CHUCK CLAW FOR THE TRANSPORTATION DEVICE

CROSS-REFERENCE TO PRIOR APPLICATION

This is a U.S. National Phase Application under 35 U.S.C. §371 of International Patent Application No. PCT/JP2003/017045, filed Dec. 26, 2003 and claims the benefit of Japanese Patent Application Nos. 2002-381776, filed Dec. 27, 2002 and 2002-382270, filed Dec. 27, 2003, all of which are incorporated by reference herein. The International Application was published in Japanese on Jul. 22, 2004 as WO 2004/060779 A1 under PCT Article 21(2).

BACKGROUND OF THE INVENTION

The present invention relates to a chuck device for containers, a conveyor device equipped with the chuck device, and a chuck claw thereof.

An example of a conveyor device used with a beer bottle inspection device or the like is a rotating star wheel device in which a disc referred to as a star wheel is formed with multiple pockets into which bottles are fit. By supporting and releasing bottles from the pockets, bottles can be placed in appropriate positions along the rotation path of the star wheel. Examples of bottle supporting structures of the star wheel device include one that uses a suction cup (e.g., Japanese laid-open patent publication number Hei 11-106039) and one that uses a pair of chuck claws that can open and close (e.g., Japanese laid-open patent publication number Hei 10-7243).

Chuck-type star wheel devices are believed to be better suited for high-speed operations than suction-types, but designing a mechanical chuck device requires simple mechanisms and flexibility in operations. Also, when multiple chuck devices are to be provided, it must be possible to quickly attach and remove chuck claws to the chuck devices or else the maintenance for the chuck claws becomes too complex.

SUMMARY OF THE INVENTION

The present invention provides a chuck device and a conveyor device using the chuck device that can improve the degree of freedom involved in operation, that can provide a simplified structure, and that can be suitable for higher conveyor speeds. The present invention also provides a chuck device with a removable chuck claw, a chuck claw used by the device, and a conveyor device that uses the chuck claw and the chuck device.

According to the present invention a chuck device includes: supporting structure; a pair of arms rotatably supported on the supporting structure by way of a pair of arm shafts, chuck claws for grasping a container disposed on ends of the pair of arms that open and close in tandem with rotation around the arm shafts; and an operation member capable of being operated on externally. Inward from the pair of arms is disposed a first drive section capable of integrally rotating around the arm shaft of a first arm and being integral with the first arm, and a second drive section disposed further toward the end of the arm than the first drive section and capable of rotating integrally around the arm shaft of a second arm and being integral with the second arm. Biasing means biases the pair of arms around the arm shafts in a direction of closing the ends of the arms. A motion input mechanism is disposed between the operation member and the first drive section and converts external motion accompanying operation of the operation member to a rotation motion of the first drive section centered around the arm shaft. A coupling mechanism is disposed between the first drive section and the second drive section and converts rotational motion of the drive section around the arm shaft to a rotational motion of the second drive section around the arm shaft.

With this chuck device, when the operation member is operated and the first drive section is rotated around the arm shaft, the second drive section also rotates around the arm shaft so that the pair of arms pivot to open and close the chuck claws. Since the motion of the operation member is first transmitted from the first drive section to the arm thereof, and this rotation motion is transmitted to the second drive section by way of a coupling mechanism, it is possible to define the operations of each arm by changing the way the motions are converted. For example, it is possible to change how the second arm moves without changing how the first arm moves in response to operation of the operation member, or the operation of the first arm in response to operation of the operation member can be changed while adjusting the coupling mechanism to cancel out this change so that the operation of the second arm does not change. Of course, the pair of arms can be operated symmetrically as well.

In the first chuck device of the present invention, the motion input mechanism uses a cam mechanism to convert a motion of the operation member to rotation motion of the first drive section. By using the cam mechanism, the element opposing the cam surface (the cam driven element) can simply be pressed against it, eliminating the need for connecting the elements, e.g., with a linking mechanism. Thus, the structure is simplified and assembly and disassembly can be performed easily.

According to another aspect, the cam mechanism of the motion input mechanism is equipped with an arm drive cam supported by the supporting structure to allow rotation around a cam axis line parallel to the arm shaft, a cam surface being formed on an outer perimeter of the arm drive cam. The arm drive cam is disposed opposite from the second drive section relative to the first drive section. The arm drive cam is rotated by external operation of the operation member. As the arm drive cam rotates, the cam surface of the arm drive cam moves back and forth between a position where the first drive section is pushed out toward the second drive section and a position where the first drive section is retracted to an opposite side from the second drive section.

In this case, the arm drive cam rotates back and forth according to the direction in which the operation member is operated, and the first drive section is driven in the direction toward the second drive section or away from the second drive section. Since the second drive section is pushed against the first drive section by biasing means, the second drive section rotates around the arm shaft in tandem with the first drive section regardless of which direction the first drive section is driven.

It is also possible for a first roller that comes into contact with the cam surface of the arm drive cam to be disposed on the first drive section. Using the roller can reduce the friction resistance at the cam surface, just making the mechanism operate more smoothly. Furthermore, a roller shaft parallel to the arm shaft can be disposed on the first drive section. On the roller shaft, there can be disposed a first roller coming into contact with the cam surface of the arm drive cam, and a second roller coming into contact with the second drive section.

A support section can be disposed on the cam surface of the arm drive cam to support the first drive section at a position pushed out toward the second drive section. By providing this type of support section, when the first drive section is pushed out toward the second drive section by the biasing mechanism, the supporting force opposing the biasing mechanism force does not need to be applied continuously to maintain the arm drive cam at the same position. Thus, restrictions on the design of the mechanism for operating the operation member can be relaxed. For example, when the biasing mechanism biases the chuck claws in the closing direction, the absence of a supporting section would require keeping the chuck claws open by continuously guiding the operation member with a cam groove or the like so that the supporting force continues to be applied to the operation member. However, if the support section is provided, the first drive section can be guided to the support section to keep the arm drive cam and the first drive section at a fixed position without applying any force to the operation, thus allowing the chuck claws to be kept open. Thus, the mechanism for operating the operation member is simplified. Providing a cam groove or the like along the conveyor path to support the operation member leads to a larger cam and increases costs. In particular, if a cam groove is used, complex cleaning tasks are required to prevent clogging of the groove. Providing a support section on the cam surface eliminates this problem.

The coupling mechanism can use a cam mechanism to convert rotation motion of the first drive section to rotation motion of the second drive section. In this case, the use of the cam mechanism eliminates the need to connect the first drive section and the second drive section together. Thus, the structure is simplified and assembly and disassembly is made easy. In particular, it is preferable to have both the motion input mechanism and the coupling mechanism use cam mechanisms. In one preferable form of the cam mechanism of the coupling mechanism, a cam surface that comes into contact with the first drive section is disposed on the second drive section. By changing the shape of the cam surface, the manner in which the second arm works in response to the first arm can be changed.

The biasing mechanism can include one or more springs disposed between the support means and the second arm and biasing the second arm so that the chuck claws are biased in a closing direction. Simply providing biasing means between the arms will not restrict the arms to turn in the same direction around the arm shafts. When this type of motion takes place, the first drive section and the second drive section are displaced away from each other, and the coupling of the arms is temporarily lost, allowing the arms to move freely. However, in the above structure where the biasing mechanism is extended between the support structure and the second arm, the second drive section can be pressed toward the first drive section regardless of how the arms are operating.

The biasing means can be torsion coil springs on each of the pair of arm shafts to bias the pair of arms so that the ends are biased in a closing direction. By providing torsion coil springs on the arm shaft, the pair of arms can be biased symmetrically, and the need to extend the arms back past the arm shaft is eliminated. As a result, the structure of the arms is simplified, and the space behind the arms can be used effectively.

Furthermore, in the structure in which the arm drive cam is disposed on the cam mechanism as described above, it is possible to have torsion coil springs disposed as biasing means on each of the pair of arm shafts to bias the pair of arms so that the ends are biased in a closing direction; and both ends of a cam shaft can rotatably support the pair of arm shafts and the arm drive cam can be supported by the supporting structure. As a result, the arm shaft and the cam shaft of the arm drive cam can be firmly supported so that these elements are prevented from flexing.

The first conveyor device according to the present invention includes: the first chuck device according to the present invention; and a mobile body moving the support structure of the chuck device along a predetermined conveyor path. With this type of conveyor device, containers can be conveyed by supporting the container with the chuck device while the mobile body moves. Multiple chuck devices can be disposed along the conveyor path of the mobile body. For example, in a star wheel conveyor device, chuck devices can be disposed along the outer perimeter of a rotating wheel and oriented outward, i.e., with the chuck claws oriented toward the outer perimeter side. Furthermore, an operation section can be provided on the conveyor path that operates an operation member by coming into contact with the operation member in response to movement of the chuck device. By operating the operation member using the operation section, the chuck claws can be closed or opened at a predetermined position on the conveyor path, so that a container can be retrieved or deposited.

The operation section can include a movable section capable of moving between an active position, where the operation section is in contact with the operation member and operates the operation member, and a stand-by position away from the operation member. In this case, by switching the active unit between an active position and a stand-by position, it is possible to change whether or not the chuck claws operate at the positions where the active units are installed. Furthermore, the movable section can be driven by an electrical servo motor between the active position and the stand-by position. By using a servo motor, accurate operations can be performed at high-speeds. Thus, the invention can handle high-speed conveyors better.

A second chuck device according to the present invention provides a chuck device wherein a chuck claw is removably mounted on an end of an arm driven to perform a grasping action. A cylindrically indented bearing surface is disposed on the arm. A holding piece equipped with a cylindrical outer perimeter surface curved along the bearing surface is disposed on the bearing surface using tightening mechanism. An attachment base curved along the bearing surface and capable of being inserted between the support piece and the bearing surface is disposed on the chuck claw.

With this chuck device, the tightening applied by the tightening mechanism on the support piece can be loosened to enlarge the gap between the bearing surface and the support piece, the attachment base of the chuck claw can be inserted into the gap, and the support piece can be tightened against the bearing surface to have the support piece and the bearing surface support the interposed chuck claw. Since the bearing surface and the support piece have cylindrical surfaces, the chuck claw is prevented from rotating by the bearing surface and the support piece. As a result, further operations to prevent rotation of the support piece and the chuck claw are not needed. For example, even if a single bolt is used as the tightening mechanism, the chuck claw will not rotate around the bolt. Thus, according to the second chuck device of the present invention, the chuck claw can be easily attached and removed.

In the second chuck device of the present invention, it is preferable for the tightening mechanism to be a bolt. Since there is no need to stop rotation, a single bolt used as the tightening mechanism for a single support piece is sufficient. When a bolt is used, it is preferable for a slit to be formed on the attachment base of the chuck claw to allow the bolt to pass through. By passing through the bolt through this type of slit, the attachment base can be inserted deeply into the gap between the bearing surface and the support piece without removing the bolt. Thus, the chuck claw can be more easily attached and removed.

It is also possible to have a chuck bearing disposed on the arm to receive reaction generated on the chuck claw during the grasping action. The bearing surface may be formed to connect with a side of the chuck bearing section that comes into contact with the chuck claw. The bolt can be set up to attach to the bearing surface in such a direction that, going toward a rear end of the arm, the bolt extends from the bearing surface toward a back surface relative to a side of the arm in contact with the chuck claw. With this structure, an adequate threading depth for the bolt can be provided even if the chuck bearing is thin.

Furthermore, it is also possible to have an arm shaft rotatably supporting the arm to be disposed behind the bearing surface, and to have the bolt screwed in between the bearing surface and the arm shaft. As a result, a deep threading depth for the bolt can be provided while avoiding the arm shaft.

It is also possible to have left and right arms, a bearing surface disposed inward from each arm, the bolts passing through the support pieces from inward of the arms being screwed into the arm, and slits being disposed at ends of the chuck claws to allow insertion of a tool used to manipulate the bolts. With this structure, the slit toward the end of the chuck claw can be used to insert a tool such as a wrench. This allows a bolt hidden between the chuck claws to be easily and adequately manipulated.

It is also possible to have a spring mechanism disposed between the support pieces attached to the bearing surfaces of the arms to draw the support pieces toward each other. In this case, loosening the bolt will result in the support piece being pulled by the spring mechanism away from the bearing surface. As a result, the attachment base of the chuck claw can be easily pulled out from the gap between the support piece and the bearing surface.

The chuck claw can be formed from various materials, but it is preferable for the chuck claw to be metal. If metal is used, the chuck claw can be made thin while still maintaining adequate strength. The elasticity of the chuck claw can be used to improve the ability of the chuck claws to handle different shapes and sizes of the object to be grasped. Also, by making the chuck claw thin, when multiple chuck devices are used, the pitch between the chuck devices can be reduced, thus conserving space.

In the chuck claw of the present invention, a grasping section performing grasping actions is formed on a first end; and an attachment base curved to form a cylindrical surface is formed on a second end. This type of chuck claw can be used suitably in the second chuck device of the present invention.

In the chuck claw of the present invention, it is also possible to have a slit extending in a perimeter direction of a cylindrical surface defined by the attachment base disposed on the attachment base. Also, a slit that divides the grasping section along a direction of an axis of a cylindrical surface defined by the attachment base can be formed on the grasping section.

Furthermore, a second conveyor device according to the present invention includes: a mobile body capable of pivoting around a predetermined center; and a chuck device. A plurality of the chuck devices are disposed along an outer perimeter of the mobile body. With this type of conveyor device, effective use can be made of the advantage of the chuck device of the present invention in that the chuck claw can be easily attached and removed.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
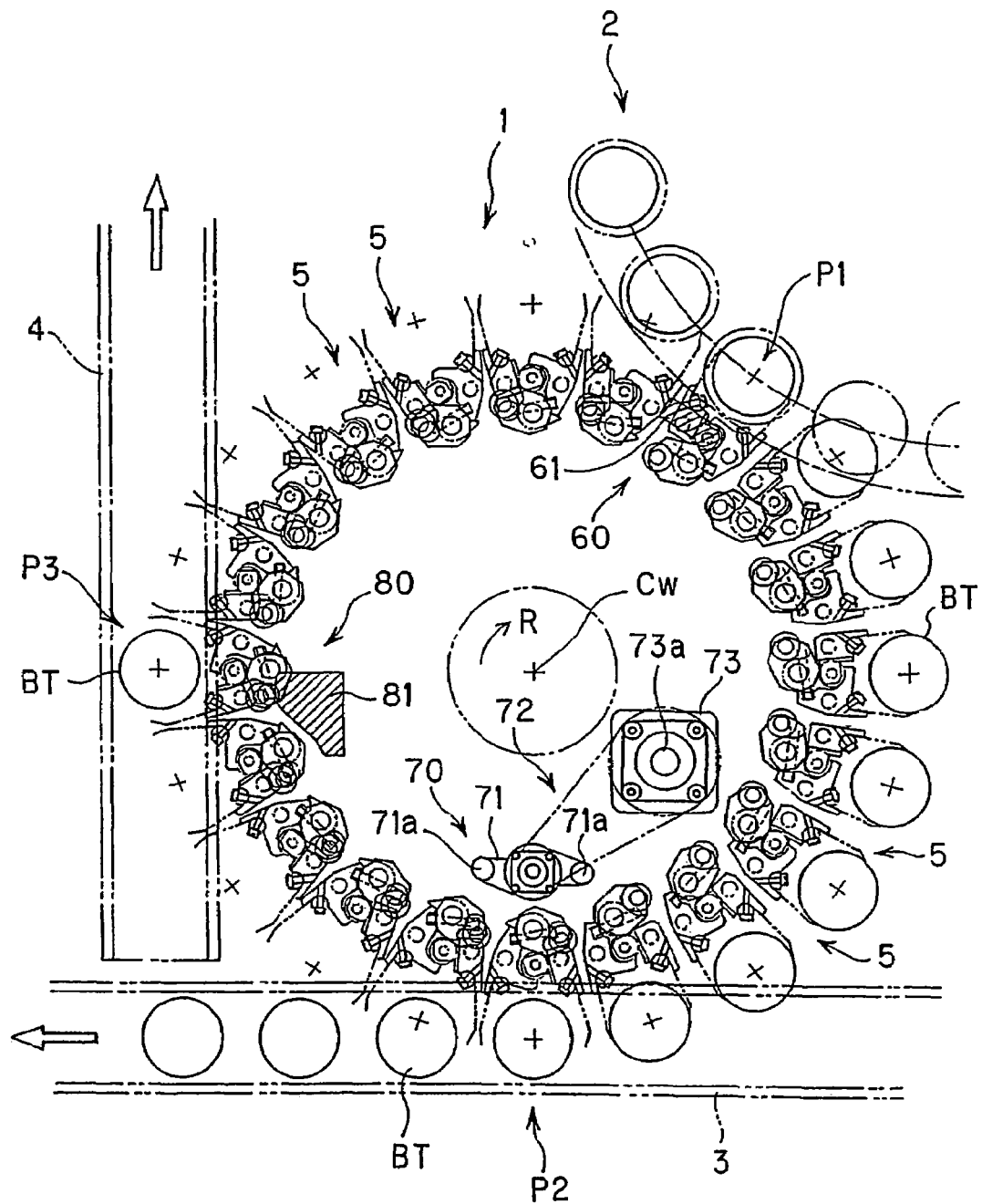
FIG. 1 is a plan drawing of a starter wheel device in which chuck devices of the present invention are used.

FIG. 1 is a plan drawing of a star wheel for conveying beer bottles in which a chuck device of the present invention is implemented. A star wheel device 1 is formed as an exit star wheel device, e.g., an inspection device used to inspect bottles BT. Bottles BT are received at an entry position P1 from a separate star wheel device 2 that support bottles BT being inspected. The bottles BT are sent out from a first exit position P2 or a second exit position P3 to a first conveyor 3 or a second conveyor 4. Multiple chuck devices 5, . . . , 5 for supporting the bottles BT are disposed along the outer perimeter of the star wheel device 1 at a fixed pitch.

Figure 2:
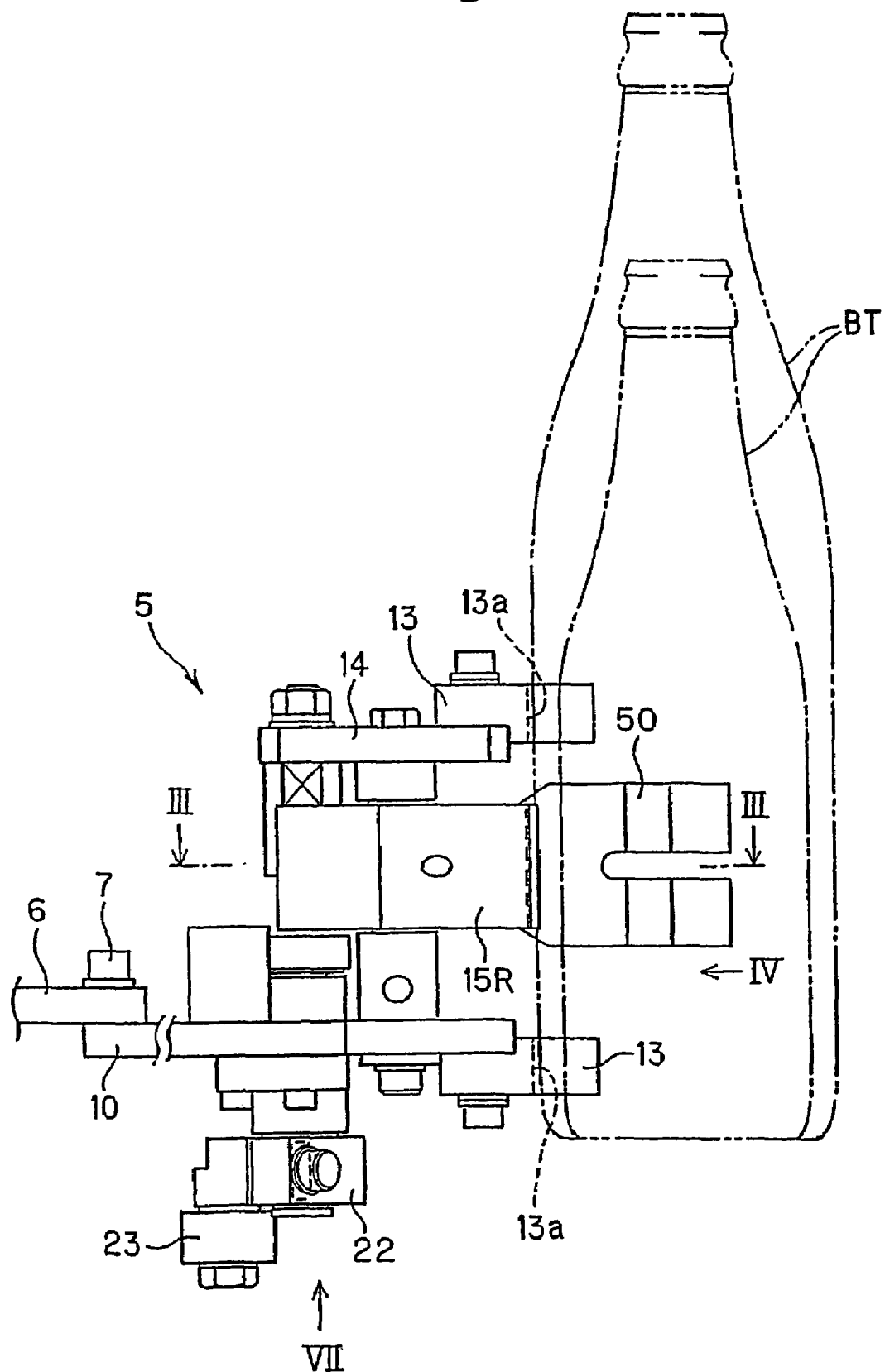
FIG. 2 is a side-view drawing of a chuck device from FIG. 1.

As shown in FIG. 2, the chuck device 5 is equipped with a base 10 and a chuck claw 50 for grasping the bottle BT. The base 10 is secured to the outer perimeter of a wheel (moving body) 6 of the star wheel device 1 using a securing structure 7 such as a bolt. The wheel 6 is rotated around a wheel center Cw by a drive device, not shown in the figure, in a predetermined rotation direction (indicated by arrow R in FIG. 1). Thus, the chuck devices 5 are also rotated around the wheel center Cw along with the wheel 6.

A guide 13 is attached to the base 10. The guide 13 is equipped with a guide surface 13a curved along the outer perimeter of the bottle BT. Taking into account the tolerance of the diameter of the bottle BT to be grasped by the chuck device 5, the curvature radius of the guide surface 13a of the guide 13 is set slightly larger than the radius of the bottle BT. If the chuck device 5 is set up to handle bottles BT of multiple sizes, the guide 13 is either set up for the bottles BT with the maximum diameter or guides 13 can be set up according to the specific type of bottle BT. In this embodiment, the guide 13 can be omitted if the chuck claw 50 can adequately constrain the bottles BT.

As shown in FIG. 3 through FIG. 6, left and right arms 15L, 15R are attached on the upper surface side of the base 10 so that it can rotate around upwardly extending arm shafts 16L, 16R. The arm shafts 16L, 16R are disposed in symmetrical positions relative to a reference line CL connecting the center Cb of the bottle BT and the wheel center Cw (see FIG. 1). The upper ends of the arm shafts 16L, 16R are connected by a top plate 14 and bolts 14a. As shown in FIG. 2, the guide 13 is attached to the top plate 14 as well. In this embodiment, the "left" and "right" of the chuck device 5 is defined in terms of when the chuck device 5 is viewed along the reference line CL from the wheel center Cw side. Thus, the side above the reference line in FIG. 3 and the side to the right in FIG. 4 correspond to the left side of the chuck device 5.

Figure 3:
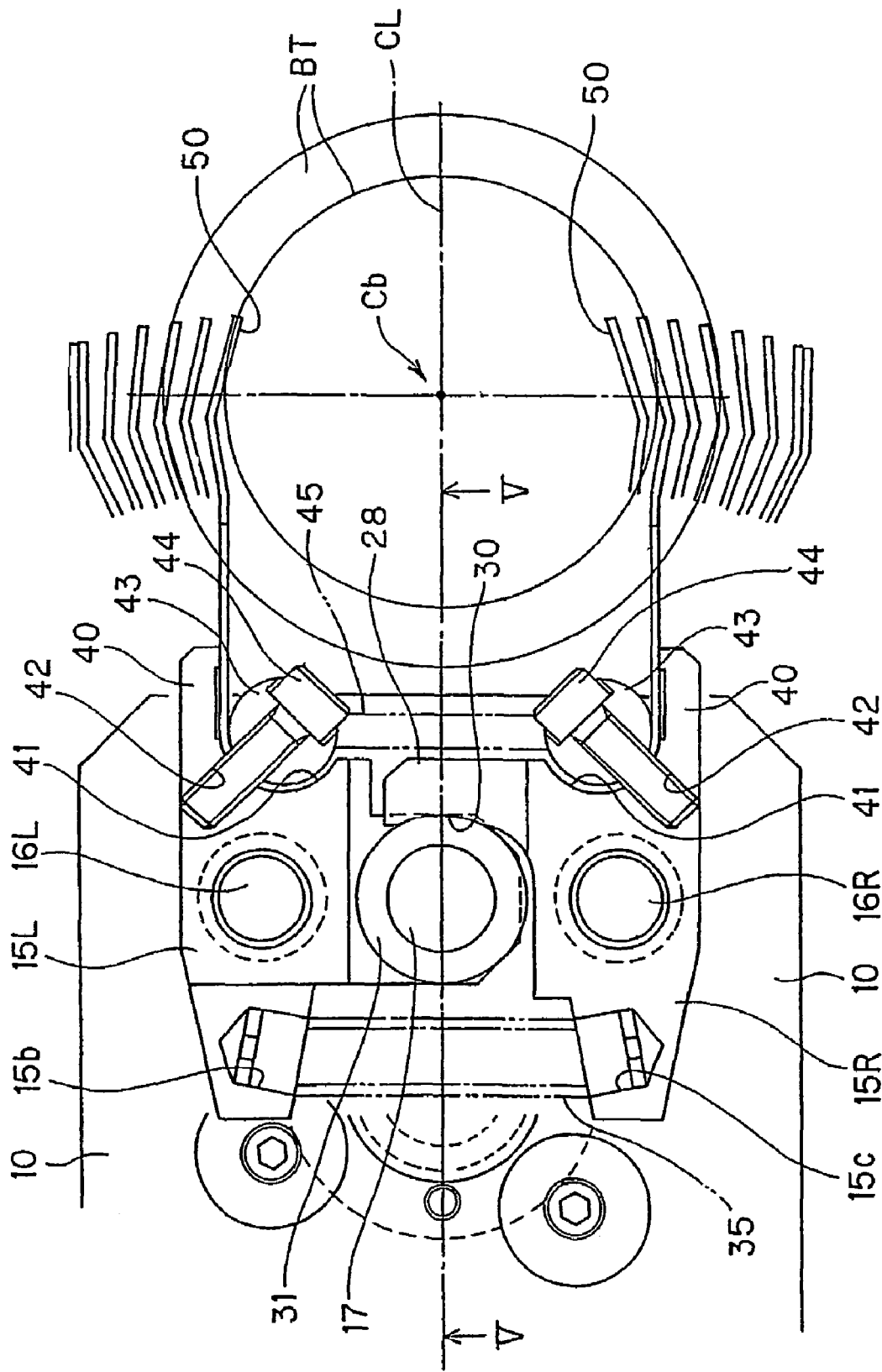
FIG. 3 is a cross-section drawing along the line III-III in FIG. 2.
Figure 4:
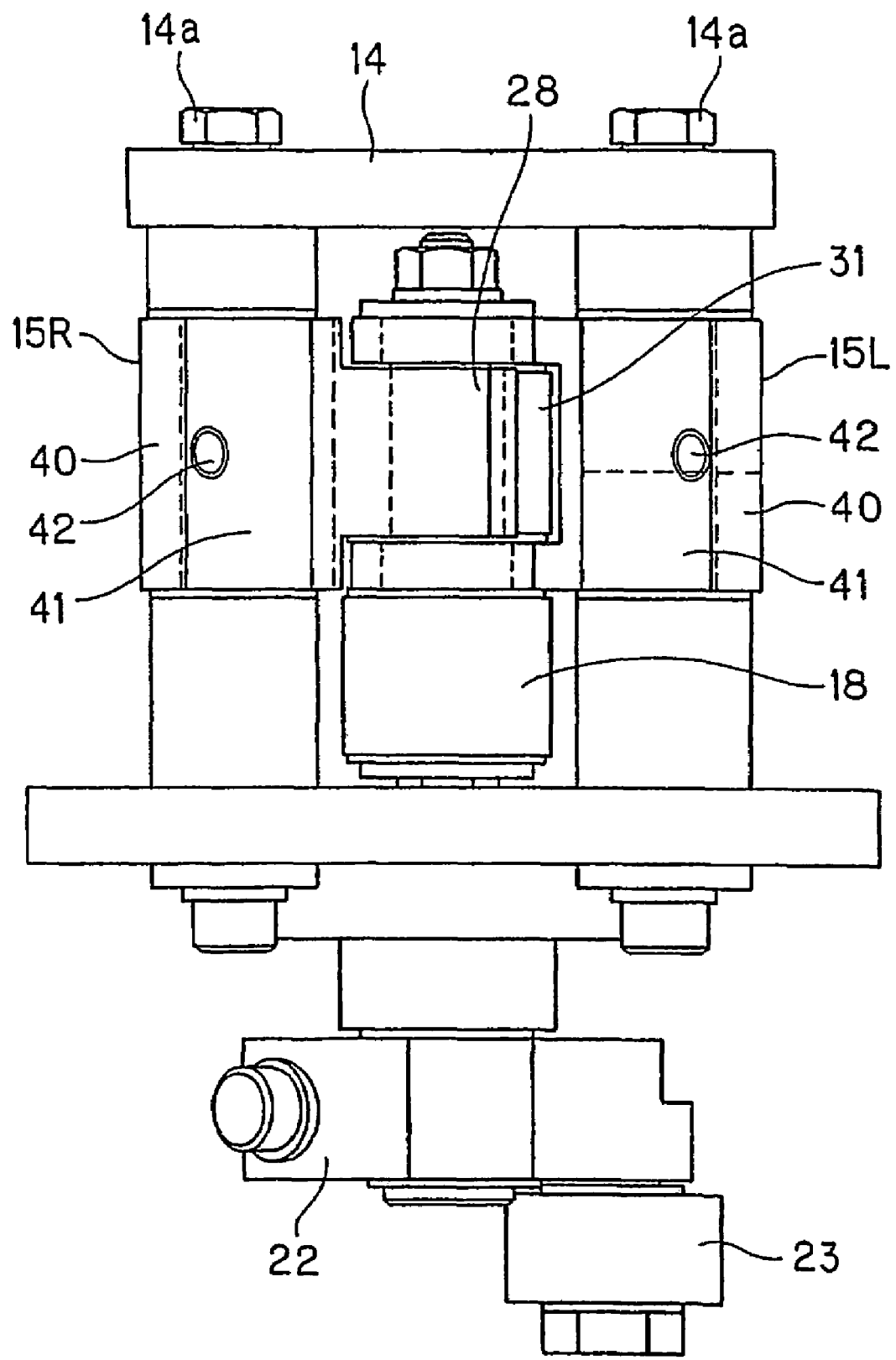
FIG. 4 is a drawing of the chuck device as seen from the arrow IV in FIG. 2.
Figure 5:
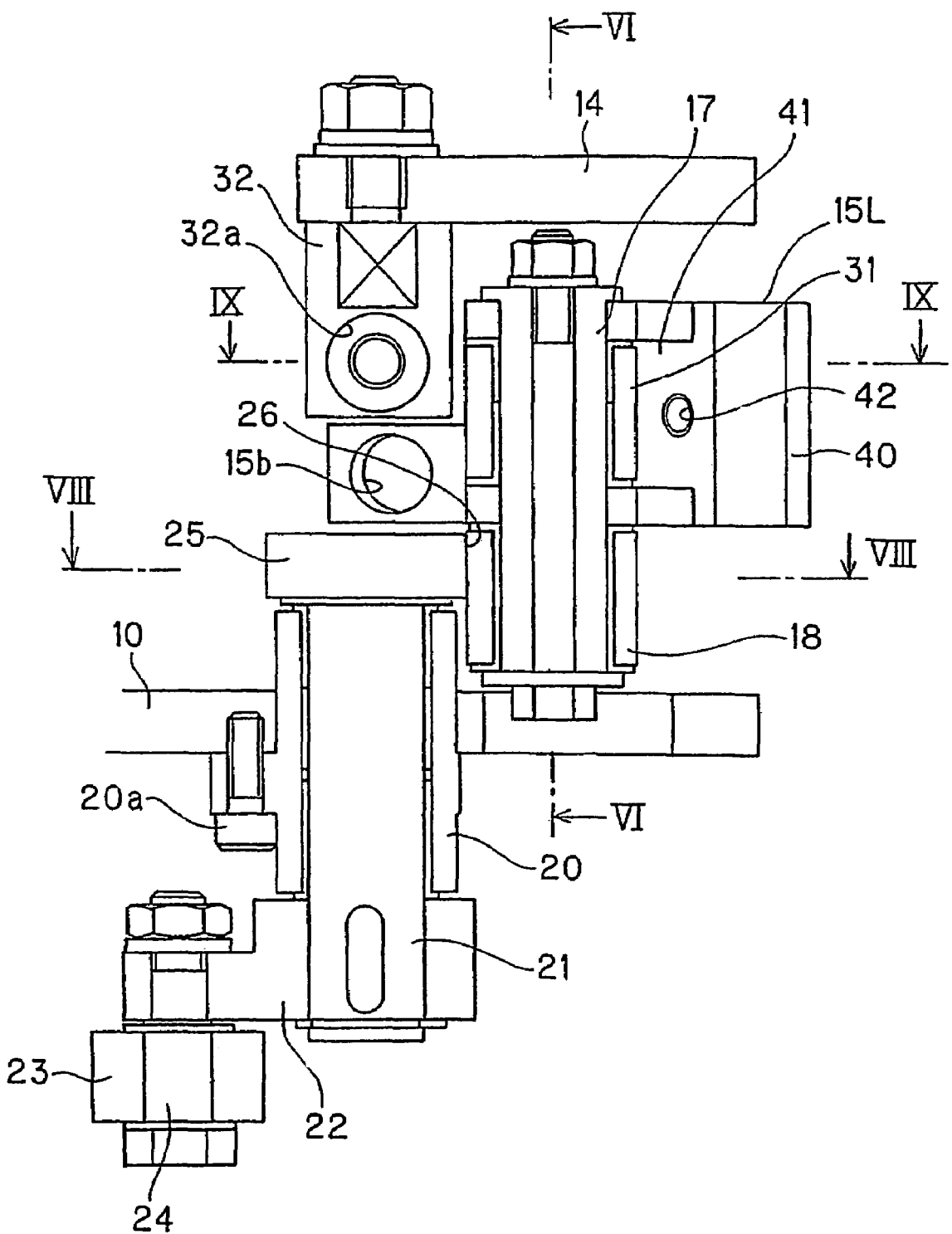
FIG. 5 is a cross-section drawing along the line V-V in FIG. 3.
Figure 6:
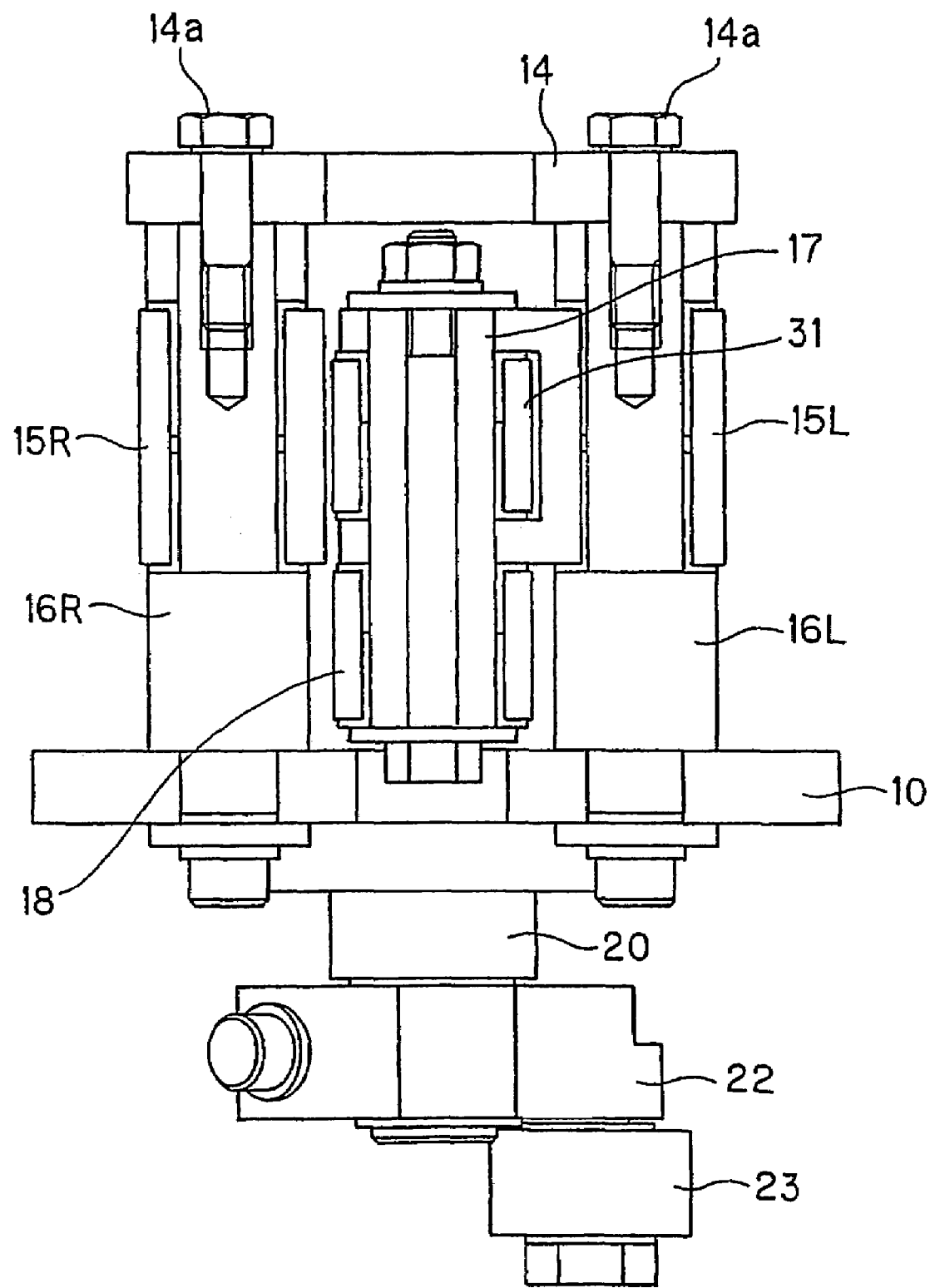
FIG. 6 is a cross-section drawing along the line VI-VI in FIG. 5.
Figure 7:
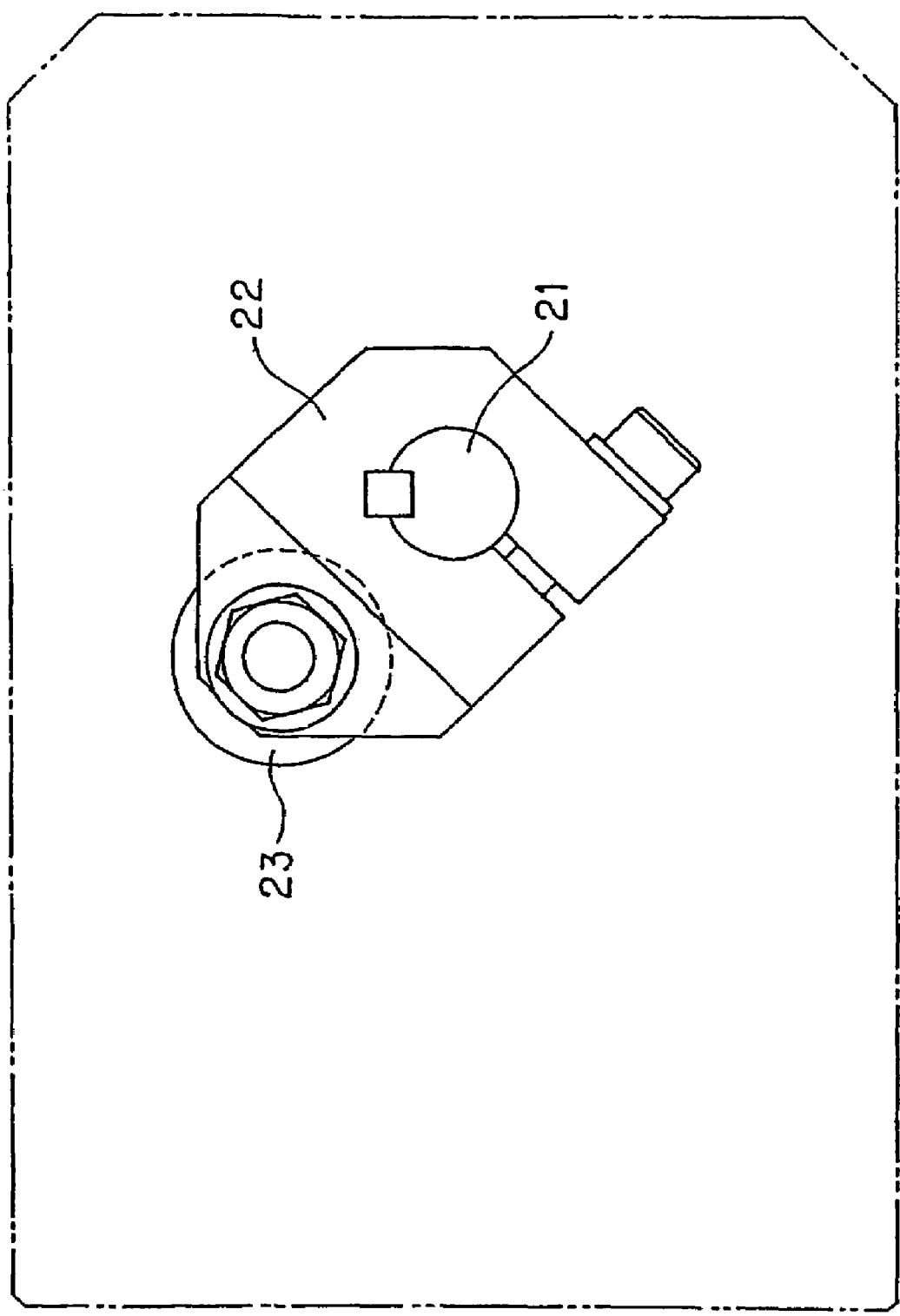
FIG. 7 is a drawing showing the chuck device as seen from the arrow VII in FIG. 2.

As shown in FIG. 3, FIG. 5, and FIG. 6, a roller shaft 17 is attached at the inside of the arm 15L and parallel to the arm shaft 16L. A first roller 18 is rotatably attached at the outer perimeter of the lower section of the roller shaft 17. A bracket 20 is secured using a bolt 20a to the lower surface side of the base 10. A cam shaft 21 extending up and down is rotatably attached to the bracket 20. The cam shaft 21 is disposed along the reference line CL and away from the roller shaft 17 toward the wheel center Cw (to the left in FIG. 5). As shown in FIG. 7, the lower end of the cam shaft 21 projects below the base 10, and a cam drive lever 22 is attached to the projected section so that it rotates integrally with the cam shaft 21. A cam drive roller 23 is attached to the end of the cam drive lever 22 as an operating member that allows the cam drive roller 23 to rotate around a support shaft (bolt) 24.

As shown in FIG. 5, an arm drive cam 25 is attached to the upper end of the cam shaft 21 so that it rotates integrally with the cam shaft 21. As shown in detail in FIGS. 8A and 8B, the arm drive cam 25 is equipped with a cam surface 26 that comes into contact with the first roller 18. The cam surface 26 is formed by smoothly connecting a first cavity 26a, a second cavity 26b serving as a support section, and a projection 26c disposed therebetween. The curvature radii of the cavities 26a, 26b are the same as or slightly greater than the radius of the first roller 18. The distance from the rotation center of the cam shaft 21 to the cam surface 26 is shortest at the bottom of the first cavity 26a and is greatest near the boundary between the projection 26c and the second cavity 26b. The distance from the rotation center of the cam shaft 21 to the bottom of the second cavity 26b is adequately larger than the distance from the rotation center of the cam shaft 21 and the bottom of the first cavity 26a.

Figure 8A:
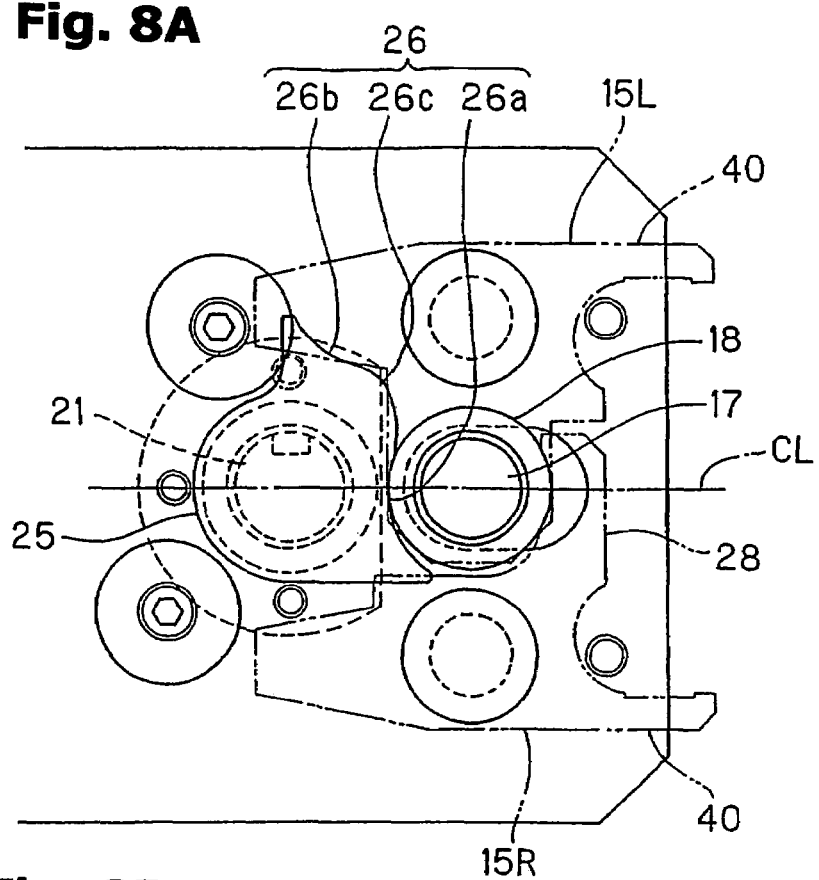
FIG. 8A is a cross-section drawing along the line VIII-VIII in FIG. 5, with the chuck bearings closed.
Figure 8B:
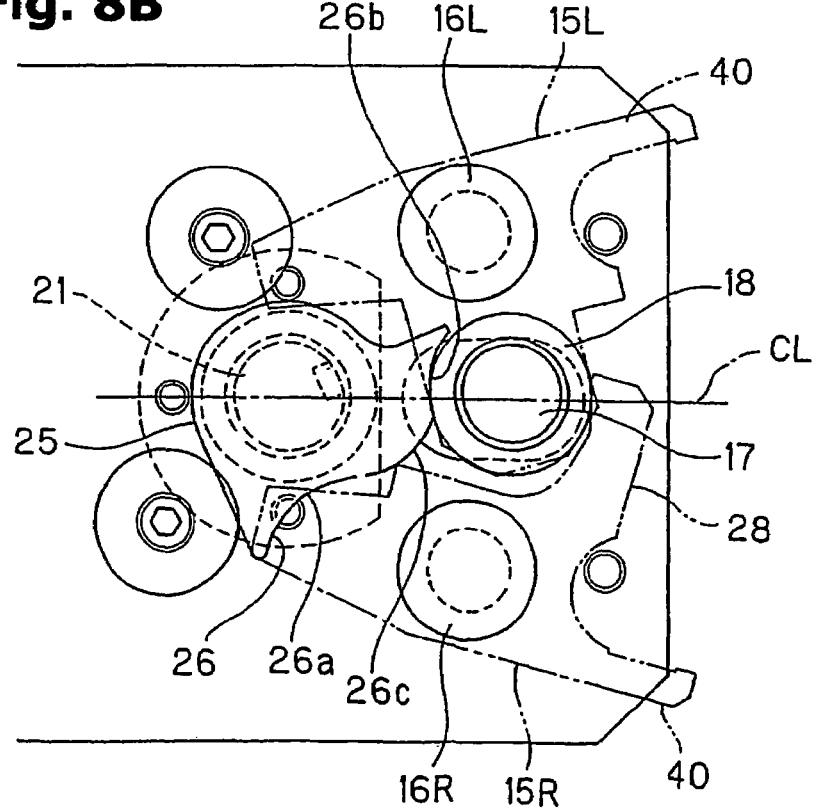
FIG. 8B is a cross-section drawing along the line VIII-VIII in FIG. 5, with the chuck bearings open.
Figure 9:
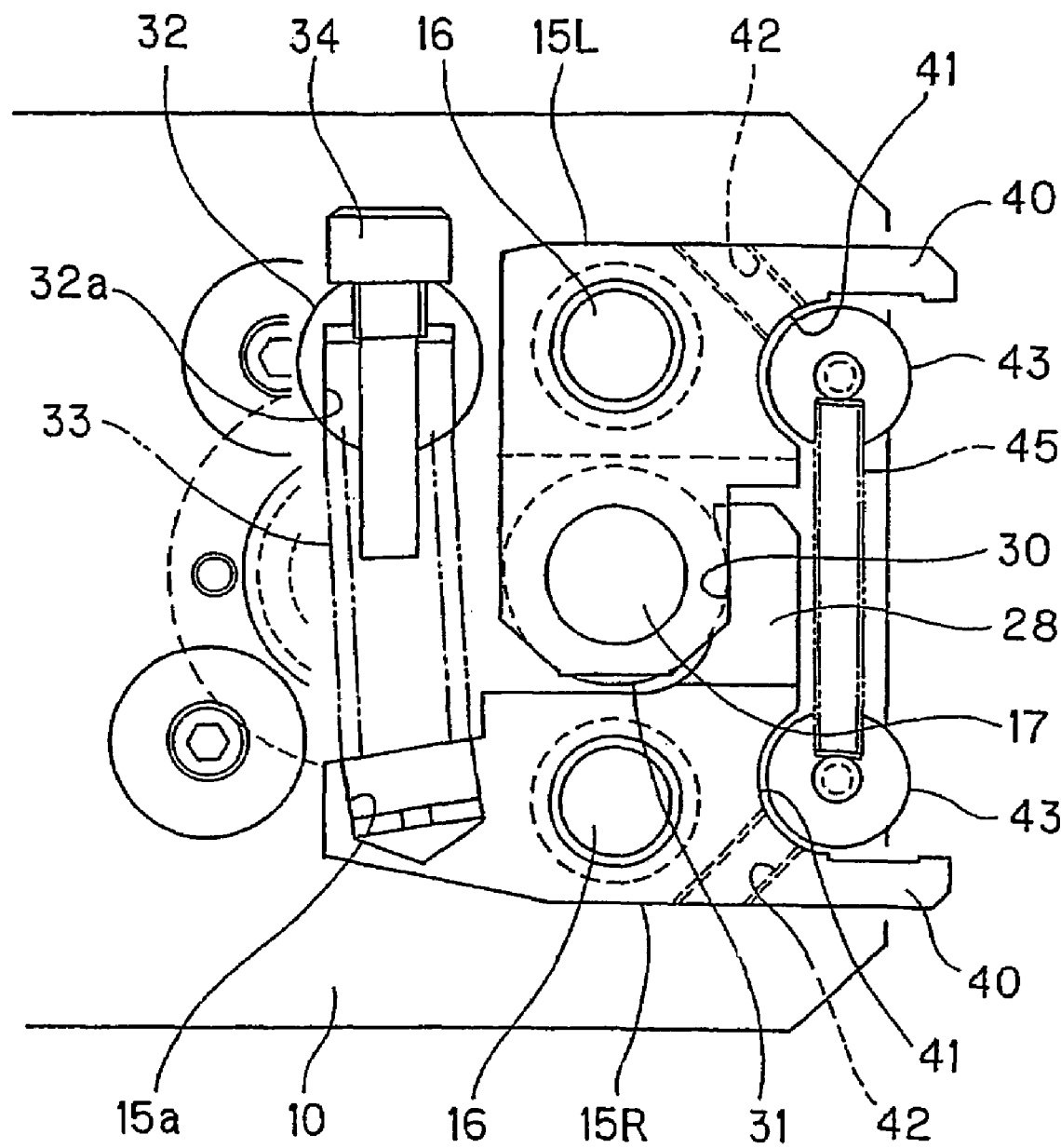
FIG. 9 is a cross-section drawing along the line IX-IX in FIG. 5.

As shown in FIG. 3 through FIG. 9, an arm drive section (second drive section) 28 is disposed on the right arm 15R so that it faces the cam shaft 21. A cam surface 30 is disposed on the arm drive section 28. A second roller 31 is rotatably attached to the outer perimeter of the roller shaft 17 at a position aligned with the cam surface 30. A post 32 is disposed behind the left arm 15L, and the top plate 14 is secured to the upper end of the post 32 (see FIG. 5). As shown in FIG. 9, a spring bearing cavity 32a is disposed on the post 32, and a coil spring 33 is attached in a compressed state between the spring bearing cavity 32a and a spring bearing cavity 15a formed at the back end side of the right arm 15R. The post 32 is connected to the base 10 by way of the top plate 14 and the arm shafts 16L, 16R and serves as part of the supporting structure for the arms 15L, 15R. As a result, the biasing mechanism, in the form of the spring 33, disposed between the supporting structure pushes the chuck claw 50 of the arm 15L in the closing direction. A bolt 34 is attached to the post 32 to guide the inner perimeter of the coil spring 33.

As shown in FIG. 3, a coil spring 35 is attached in a compressed state as a separate biasing mechanism between spring bearings 15b, 15c of the arms 15L, 15R below the coil spring 33. The repulsion of the coil springs 33, 35 bias the arms 15L, 15R around the arm shafts 16L, 16R so that chuck bearings 40 at the ends of the arms are brought toward each other (i.e., in the direction toward the reference line CL). As a result, the cam surface 30 is pushed into the second roller 31, and the first roller 18, which is co-axial to the second roller 31, is pushed into the cam surface 26 of the arm drive cam 25. Thus, the first roller 18 and the second roller 31 move around the arm shaft 16L in tandem with the rotation of the arm drive cam 25, and this is accompanied by the rotation of the arm 15L around the arm shaft 16L. Also, the arm drive section 28 rotates around the arm shaft 16R in tandem with the movement of the second roller 31, and this causes the arm 15R to also rotate around the arm shaft 16R.

As shown in FIG. 8A, when the first roller 18 is engaged with the first cavity 26a of the cam surface 26, the cam shaft 21 is positioned between the arm shafts 16L, 16R and on the reference line CL, and the chuck bearings 40 at the ends of the arms 15L, 15R are closed. As shown in FIG. 8B, when the arm drive cam 25 rotates so that the first roller 18 moves toward the second cavity 26b of the cam surface 26, the cam shaft 21 is pushed toward the outer perimeter of the wheel 6, and the arms 15L, 15R rotate around the arm shafts 16L, 16R so that the chuck bearings 40 are opened. When the first roller 18 moves past the projection 26c and engages with the second cavity 26b, the first roller 18 stays engaged with the second cavity 26b, working against the coil springs 33, 35, which provide bias in the direction of closing the arms 15L, 15R. However, when the first roller 18 applies enough rotation moment to the arm drive cam 25 to go past the projection 26c, the springs 33, 35 cause the cam 25 to rotate to a position where the first cavity 26a and the first roller 18 engage.

In the description below, the position of the arm drive cam 25 shown in FIG. 8A will be referred to as the constrained position and the position shown in FIG. 8B will be referred to as the released position. The cam drive roller 23 shown in FIG. 7 is associated with the arm drive cam 25 in a manner such that it is retracted toward the wheel center Cw when the arm drive cam 25 is in the constrained position, and is displaced toward the outer perimeter side of the wheel 6 when the arm drive cam 25 is in the released position.

Figure 10:
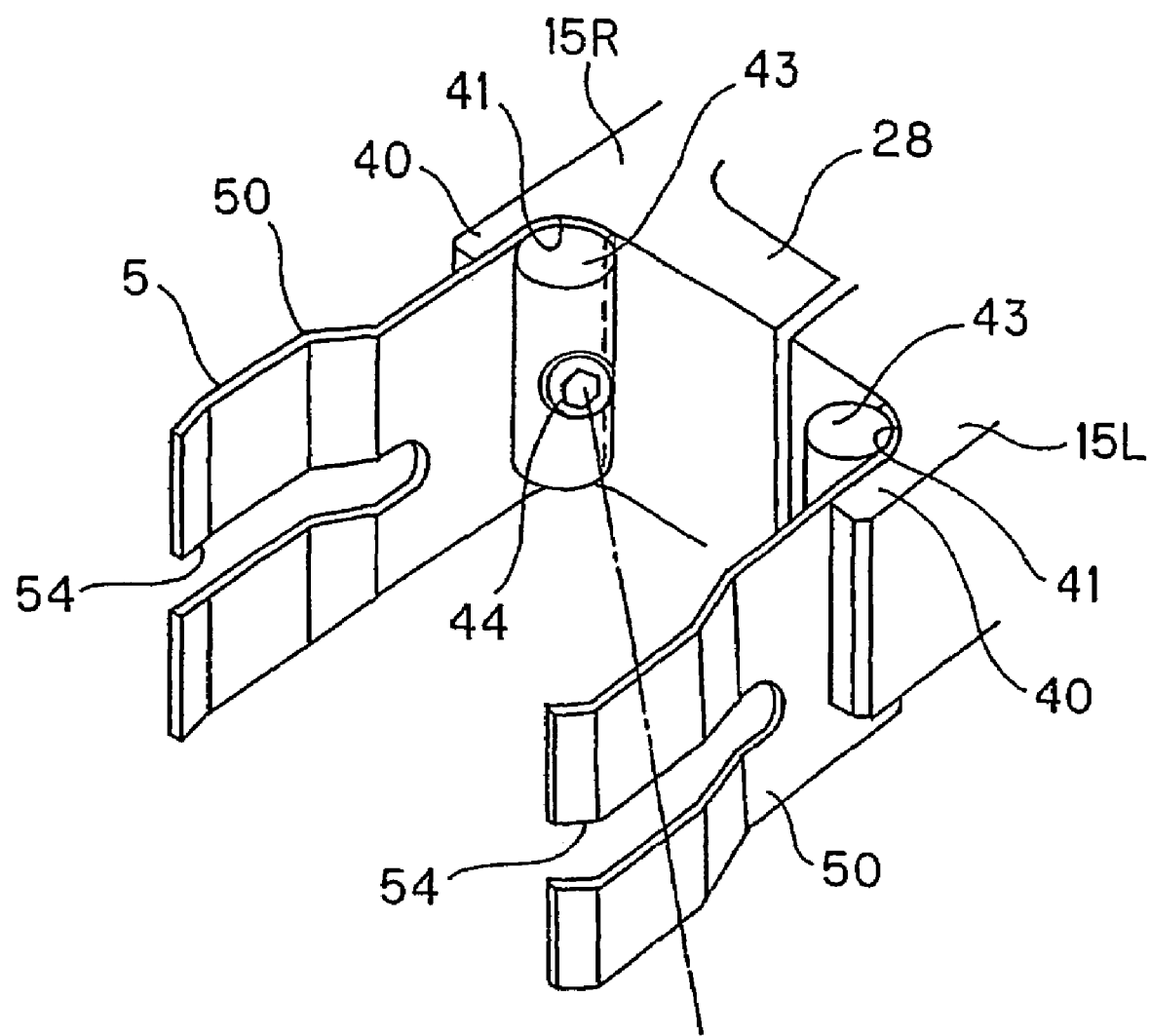
FIG. 10 is a simplified drawing as seen from the end of the chuck device.

Next, the attachment structure for the chuck claws 50 will be described. As shown in FIG. 3 through FIG. 9, bearing surfaces 41 are formed as cylindrical indentations on the inner surface sides of the base ends of the chuck bearings 40 of the arms 15L, 15R. A threaded hole 42 is formed on each of the bearing surfaces 41. The threaded holes are formed diagonally into the arms 15L, 15R so that, going from inside to outside of the arms 15L, 15R, the threaded holes 42 are recessed radially inward. As shown in FIG. 10, a cylindrical support piece 43 is attached to the bearing surface 41 by threading a single bolt 44 from the inside of the arms 15L, 15R. The chuck claws 50 are mounted to the ends of the arms 15L, 15R using these support pieces 43. Coil springs 45, 45, serving as spring mechanisms, are stretched out between the upper ends and the lower ends of the support pieces 43. FIG. 9 shows the coil spring 45 at the upper end of the support pieces 43. A section of the lower coil spring 45 is shown in FIG. 3.

Figure 11:
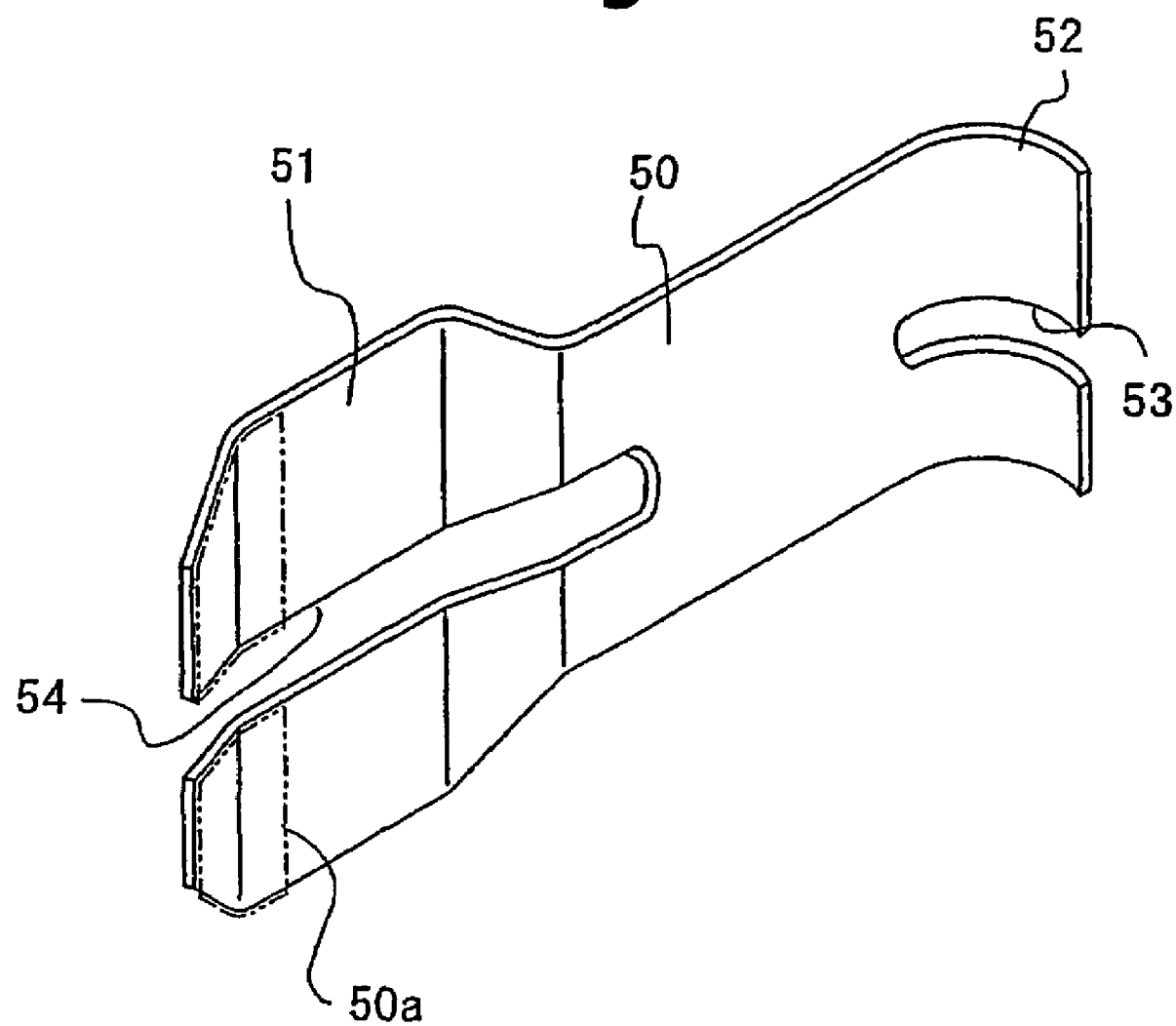
FIG. 11 is a perspective drawing of a chuck claw.

The chuck claws 45 are formed from by metalworking on thin, highly rigid sheets such as stainless steel. As shown in FIG. 11, the chuck claw 50 is equipped with a grasping section 51 for grasping the bottle BT and an attachment base 52 for attachment to the arms 15L, 15R. The attachment base 52 is curved so that it extends along the bearing surface 41, and a slit 53 is formed at roughly the center of its vertical axis and extends parallel the perimeter of the attachment 52. A slit 54 is formed in a similar manner on the side of the grasping section 51 as well. The slit 54 divides the grasping section 51 into upper and lower sections. The slit 54 on the grasping section 51 side extends across the center line of the threaded hole 42, and the width of the slit 54 is set to be large enough to allow insertion of a tool to manipulate the bolt 44 (e.g., a hex wrench). As indicated by the dotted lines in FIG. 11, a stopping member 50a may be disposed on the inner surface of the grasping section 51.

The attachment of the chuck claws 50 will now be described. The bolt 44 is loosened so that a gap somewhat larger than the thickness of the chuck claw 50 is formed between the support piece 43 and the bearing surface. The attachment base 52 is inserted in the gap between the support piece 43 and the bearing surface 41 while turning the chuck claw 50 along the bearing surface 41. The bolt 44 is passed through the slit 53. The bolt 44 is then tightened so that the attachment base 52 of the chuck claw 50 is firmly clamped between the bearing surface 41 and the support piece 43. The chuck claw 50 can be removed by loosening the bolt 44 and pulling out the attachment base 52 of the chuck claw 50 from between the support piece 43 and the bearing surface 41.

With the chuck device 5 described above, the operations of the arms 15L, 15R can be varied by changing the shape of the cam surface 30. In this example, the shape of the cam surface 30 is set up so that the chuck claws 50 move symmetrically relative to the reference line CL. However, it is also possible to assign different operations to the chuck claws 50, 50, e.g., to have one of the chuck claws 50 open first, by changing the shape of the cam surface 30.

Figure 12:
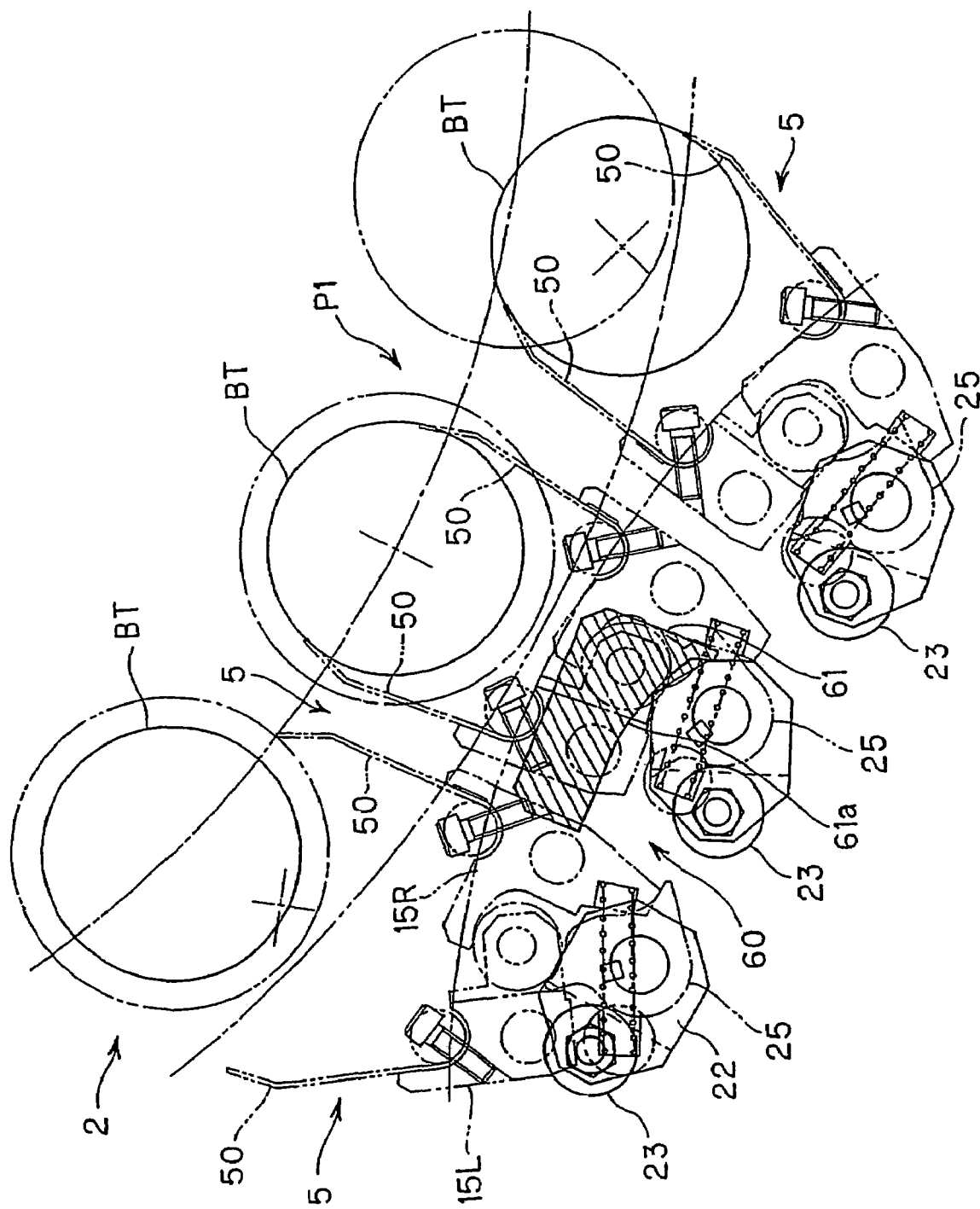
FIG. 12 is a detail drawing of the area around the entry position in FIG. 1.

As shown in FIG. 1, operation sections 60, 70, 80 are disposed at entry position P1 and exit positions P2, P3, respectively. As shown in FIG. 12, a cam block 61 is disposed on the operation section 60 at the entry position P1. The cam block 61 is secured at a fixed position relative to the rotation of the wheel 6 by being attached to a fixed section, e.g., the base, of the starter wheel device 1. A cam surface 61a facing the wheel center Cw is formed on the cam block 61. When the arm drive cam 25 of the chuck device 5 is in the free position, the cam surface 61a comes into contact with the cam drive roller 23, and, taking advantage of the rotation of the wheel 6 to a position where the first roller 18 can disengage from the second cavity 26b of the arm drive cam 25, the cam drive roller 23 is sent toward the wheel center Cw.

Figure 13:
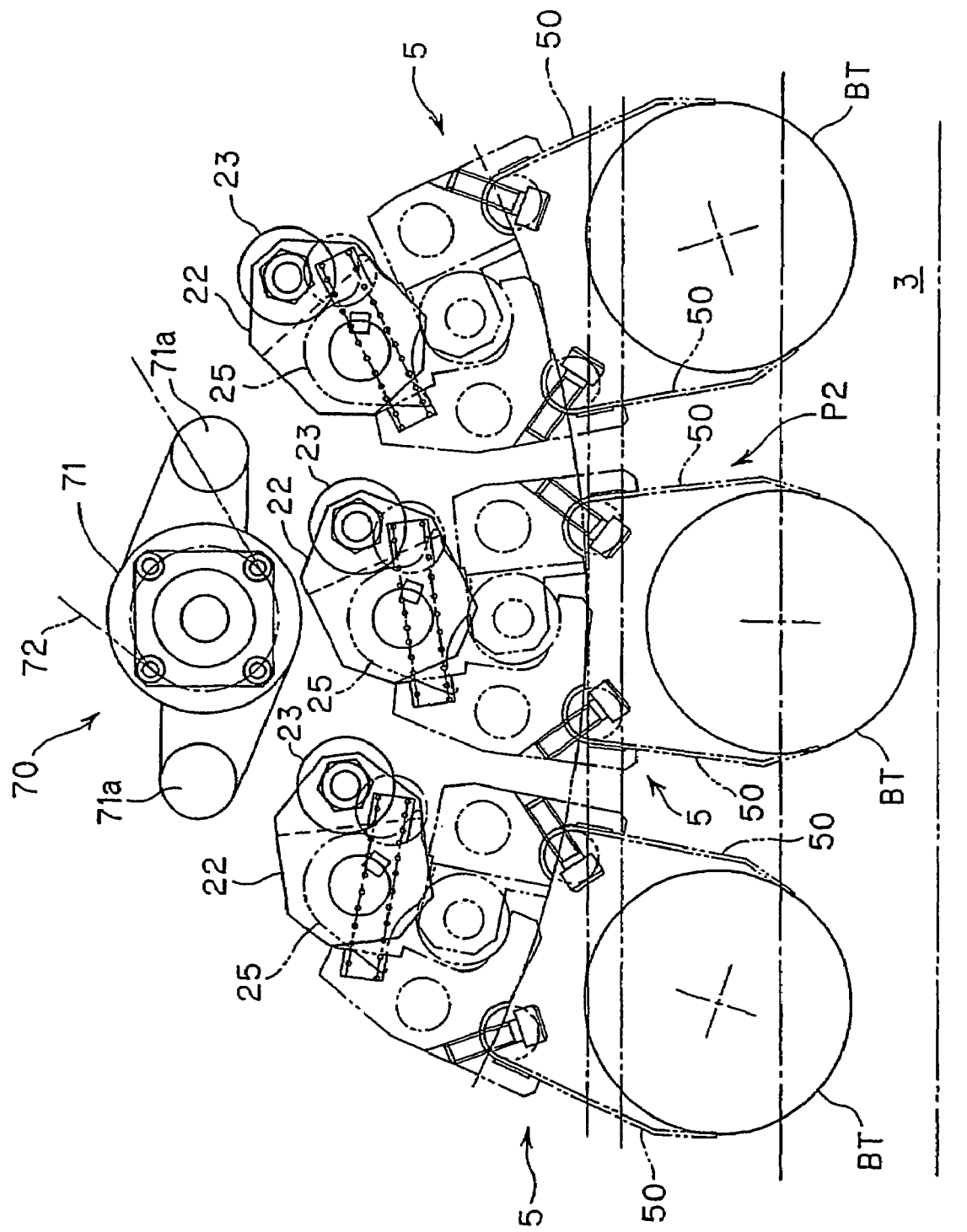
FIG. 13 is a detail drawing showing a bottle not being deposited at the first exit position in FIG. 1.
Figure 14:
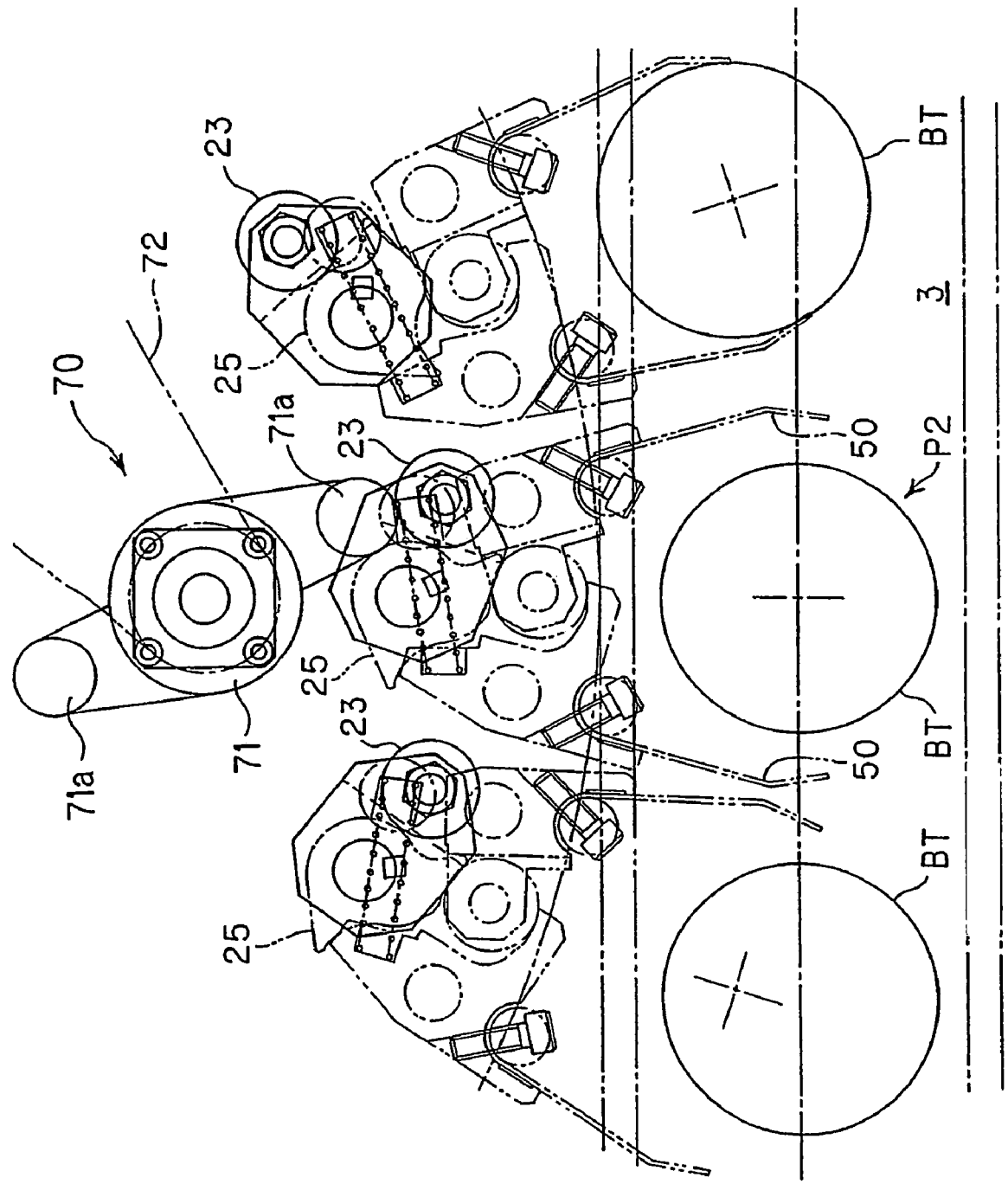
FIG. 14 is a detail drawing showing a bottle being deposited at the first exit position in FIG. 1.

As shown in FIG. 13 and FIG. 14, a rotor 71 is disposed as a movable section of the operation section 70 at the exit position P2. The rotor 71 is disposed so that it can rotate around a vertical axis, and on the outer perimeter thereof are formed a pair of arms 71a, 71a that can come into contact with the cam drive roller 23. Also, as shown in FIG. 1, the rotor 71 is connected to an output shaft 73a of a servo motor 73 by way of a transmission mechanism 72. A belt-type transmission device or the like is used for the transmission mechanism 72. Driven by the servo motor 73, the rotor 71 rotates between an active position, where the arm 71a is projected toward the chuck device 5 (FIG. 14), and a stand-by position, where the arms 71a are retracted away from the active position toward the wheel center Cw (FIG. 13). As shown in FIG. 14, when the rotor 71 is at the active position, the arm 71a comes into contact with the cam drive roller 23 when the arm drive cam 25 of the chuck device 5 is in the constrained position. The rotation of the wheel 6 up to when the arm drive cam 25 moves to the free position is used to send the cam drive roller 23 toward the outer perimeter of the wheel 6. When the rotor 71 is at the stand-by position, the arm 71a is retracted further toward the wheel center Cw than the cam drive roller 23 regardless of the position of the arm drive cam 25.

Next, the operations of the starter wheel device 1 presented above will now be described. First, the chuck devices 5 are brought out one by one to the entry position P1 of the starter wheel device 1 as the wheel 6 rotates. The arm drive cam 25 is in the free position in front of the entry position P1, and the chuck claws 50 are opened. When the chuck device 5 is brought to the entry position P1 by the wheel 6, the cam drive roller 23 comes into contact with the cam surface 61a and is pushed toward the wheel center Cw. As a result, the first roller 18 disengages from the second cavity 26b of the arm drive cam 25 and the arm drive cam 25 returns to its constrained position. This closes the chuck claws 50. In tandem with the closing of the chuck claws 50, the bottle BT is passed on from the star wheel device 2 to between the chuck claws 50, and the bottle BT is grasped by the chuck claws 50, 50 (see FIG. 12).

As the wheel 6 rotates, the bottle BT grasped by the chuck claws 50 is first conveyed to the first exit position P2. At the first exit position P2, the rotor 71 is kept at the stand-by position shown in FIG. 13. If the bottle BT is a bottle BT that should be sent out to the first conveyor 3, the servo motor 73 is driven to move the arm 71a to the active position shown in FIG. 14 when the cam drive roller 23 of the chuck device 5 is to be sent out to the first exit position P2. As a result, the cam drive roller 23 comes into contact with the arm 71a and is pushed toward the outer perimeter, causing the arm drive cam to be moved from the constrained position to the free position. Thus, the chuck claws 50 open and the bottle BT is sent out to the first conveyor 3. After the bottle BT is sent out, the rotor 71 returns to the stand-by position before the roller 23 reaches the rotation range of the arm 71a.

If the bottle BT sent to the first exit position should not be sent out to the first conveyor 3, the servo motor 73 is not activated and the rotor 71 stays in the stand-by position. Thus, the cam drive roller 23 of the chuck device 5 holding the bottle BT is not able to come into contact with the arm 71a, and the arm drive cam 25 is kept in the constrained position. Thus, as shown in FIG. 13, the bottle BT that should not be sent out is not released from the chuck claw 50, passes by the first exit position P2 and heads toward the second exit position P3.

Figure 15:
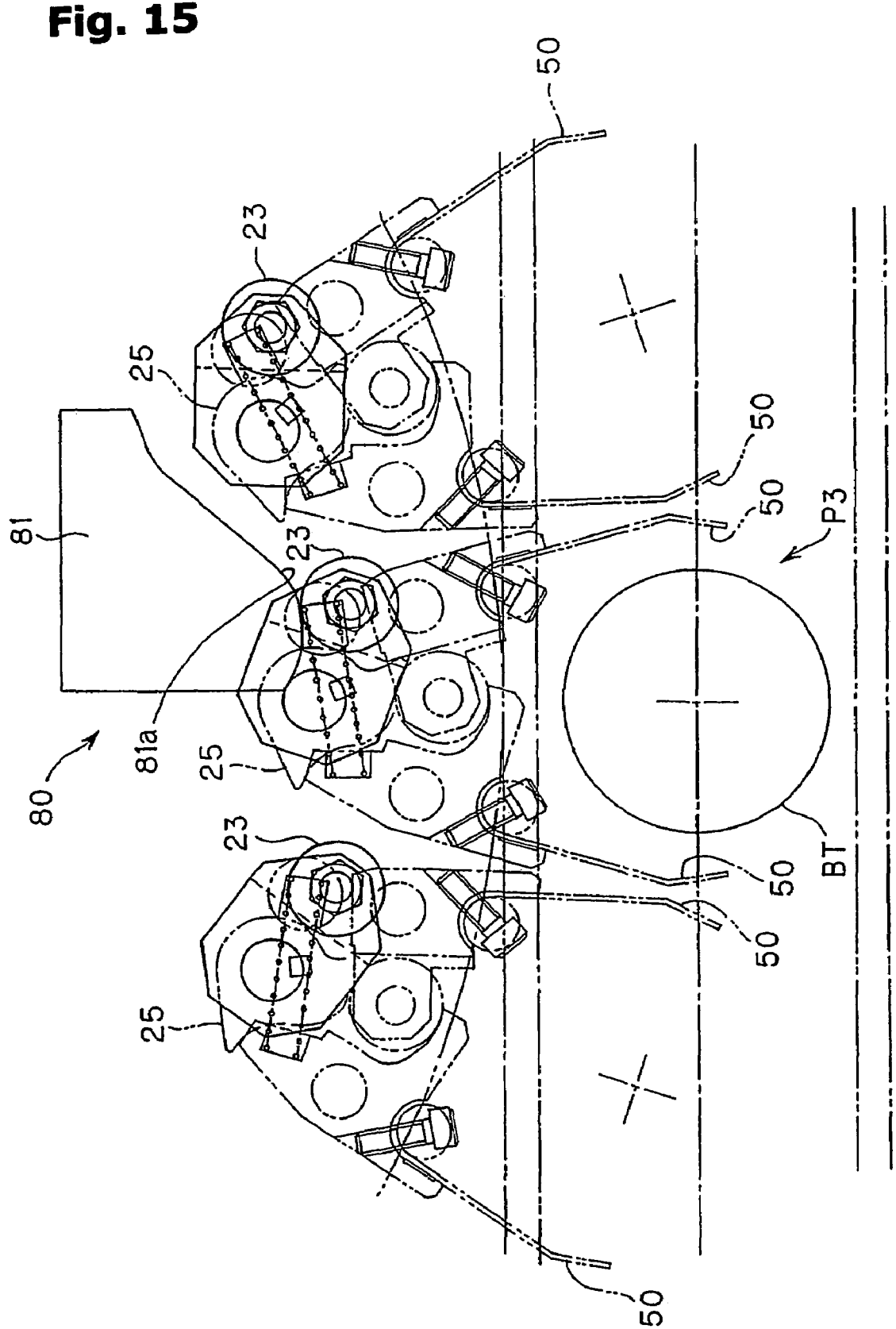
FIG. 15 is a detail drawing showing a bottle being deposited at the second exit position in FIG. 1.

As shown in FIG. 15, the cam surface 81a comes into contact with the cam drive rollers 23 of the chuck devices 5 sent one by one to the second exit position P3 as the wheel 6 rotates, and every arm drive cam 25 is switched from the constrained position to the release position. As a result, the chuck claws 50 are always opened at the second exit position P3. Thus, the bottles BT transported to the second exit position P3 are sent out to the second conveyor 4.

With the star wheel device 1 of this embodiment as described above, the bottles BT can be selectively sent out to the first exit conveyor 3 or the second exit conveyor 4 by switching the position of the rotor 71 installed at the first exit position P2. For example, when the bottles BT and their contents are inspected before the star wheel device, the rotor 71 can be switched from the stand-by position to the active position when a bottle BT that passed the inspection reaches the first exit position P2. This allows the good products that have passed the inspection to be sent to the first exit conveyor 3 while the defective products that did not pass the inspection are sent to the second exit conveyor 4.

On the other hand, if the rotor 71 is kept in the stand-by position when a bottle BT that has passed the inspection is sent to the first exit position P2 and the rotor 71 is put in the active position when a failed bottle BT is sent to the first exit position P2, the defective products that did not pass the inspection can be sent out to the first exit conveyor 3 and the good products that passed the inspection can be sent out to the second exit conveyor 4. More specifically, the rotor 71 can be kept in the stand-by position by default so that the chuck claws 50 are kept open at the first exit position P2. At the second exit position P3, the cam block 81 can be used to open the chuck claws 50 to release the bottle BT. When there is a need to separate the bottles BT that did not pass the inspection or the like, the rotor 71 can be switched to the active position to open the chuck claws 50 when the chuck device 5 holding the bottle BT reaches the first exit position P2. The rotor 71 then needs to return to the stand-by position before the next bottle BT reaches the first exit position P2.

The star wheel device 1 and the chuck device 5 of this embodiment provide the following operations and advantages.

(1) Everything from the cam drive roller 23 of the chuck device 5 to the cam surface 30 is completely mechanical. This provides superior responsiveness and reliability in the opening and closing actions of the chuck claws 50 and allows the wheel 6 to be operated at higher speeds.

(2) Since the cam surfaces 26, 30 are pressed against the opposing (driven) rollers 18, 31 using the coil springs 33, 35, there is no need to mechanically connect the arm drive cam 25 to the arms 15L, 15R, which are driven by the arm drive cam 25. This makes assembly and disassembly easy. Also, the cam surfaces 26, 30 are placed into contact with the rollers 18, 31, so friction resistance is reduced and operations can be made smoother. In the present invention, it is possible to convert the rotation of the cam shaft 21 using a linkage mechanism to open and close the arms 15L, 15R. However, if a linkage mechanism is to be used, connections must be made between the links themselves and the links to the arms and the like, increasing the number of assembly steps.

(3) Since the second cavity 26b is formed on the cam surface 26 to keep the arm drive cam 25 in the release position in opposition to the coil springs 33, 35, keeping the chuck claws 50 open does not require, on the star wheel device 1 side, keeping the cam drive roller 23 continuously at a position corresponding to the release position of the arm drive cam 25. Thus, to keep the chuck claws 50 in an open state, the rotor 71 and the cam 81 need only push the roller 23 in until the first roller 18 goes past the projection 26c and enters the second cavity 26b, and the cam 81 and the like do not need to keep pushing the roller 23 once the arm drive cam has switched to the release position. If this type of self-supporting feature were not present for the arm drive cam 25, it would be necessary to design the cam 61 so that, first, the chuck claws 50 are opened at the entry position P1, and then the chuck claws 50 are closed when the bottle BT is received. This would make the cam 61 more complicated.

(4) In order to rotationally bias the arms 15L, 15R in the direction of closing the chuck claws 50, it is necessary to provide the coil spring 35 between the arms 15L, 15R and also to provide the coil spring 33 between one of the arms 15R and the side on which the arms 15L, 15R are supported (the post 32), thus biasing the arm 15R in the direction that pushes the cam surface 30 thereof against the second roller 31. If only the coil spring 35 were to be provided, the arms 15L, 15R could pivot around the arm shafts 16L, 16R clockwise (in the view in FIG. 3), disengaging the second roller 31 and the cam surface 30, and leading to instability in the chuck claws 50, 50. However, by using the coil spring 33 to bias the arm 15R around the arm shaft 16R in the counter-clockwise direction, the arm 15R is prevented from pivoting in this manner, and the contact between the cam surface 30 and the second roller 31 can be maintained.

(5) Since the servo motor 73 is used to drive the rotor 71, the rotor 71 can be operated at high speeds and accurately, thus allowing the invention to handle high speeds for the wheel 6.

(6) Furthermore, the attachment structure for the chuck claws 50 according to this embodiment provides the following advantages. First, since the chuck claw 50 is clamped between the cylindrical bearing surface 41 and the cylindrical support piece 43, the use of only one bolt 44 does not lead to the chuck claw 50 rotating around the bolt 44. Also, since a slit 53 is disposed to allow the bolt 44 to be inserted, there is no need to detach the support piece 43 or the bolt 44 from the arms 15L, 15R when removing or attaching the chuck claws 50. Thus, the chuck claws 50 can be attached and removed easily. When the bolt 44 is removed, the pull from the coil spring 45 draws the support piece 43 away from the bearing surface 41, thus making mounting of the attachment base 52 of the chuck claw 50 even easier.

Since the chuck claws 50 are mounted inward from the arms 15L, 15R, the reaction from the force involved when the chuck claws 50 grasp the bottle BT can be applied to the arms 15L, 15R and not to the bolt 44. This is useful in maintaining the rigidity of the attachment section of the chuck claws 50. The slit 54 toward the grasping section 51 can be used to insert a tool (wrench) for manipulating the bolt 44, so even if the chuck claw 50 is attached to one of the arms 15L, 15R, the chuck claw 50 for the opposite arm 15L, 15R can be easily attached or removed. The slit 54 is needed because the threaded hole 42 is sloped. The reason for providing the slope is as follows.

Securing the chuck claw 50 firmly requires that an adequate threading depth be provided for the bolt 44. However, reducing the pitch at which the chuck devices 5 are arranged along the perimeter and increasing the number of chuck devices 5 that can be attached to the wheel 6 requires reducing the thickness of the chuck bearing 40 as much as is possible without losing strength. As a result, orienting the threaded hole 42 to be perpendicular to the chuck bearing 40 will not provide adequate thread depth. On the other hand, since the arm shafts 16L, 16R are disposed behind the chuck bearings 40, forming the threaded holes 42 from the bearing surface 41 along the reference line CL will not provide adequate length for the threaded hole 42. By extending the threaded hole 42 diagonally outward from the bearing surface 41, it is possible to maximize the length of the threaded hole 42 within the restricted space.

Furthermore, since the grasping section 51 is divided into upper and lower sections by the slit 54 of the chuck claw 50, the grasping section 51 can be formed with different shapes above and below the slit 54 to match the shape of the bottle BT. Also, when the chuck claw 50 is formed from metal such as stainless steel, adequate rigidity can be provided for the grasping section 51 even if it is thin, and more elastic deformation is possible as well. As a result, the chuck claw 50 can be elastically deformed even when grasping bottles BT having different diameters as shown in FIG. 3. Thus, the chuck claws 50 can handle bottles BT with different diameters without requiring the chucks 50 to be switched. Of course, it is also possible to switch the chuck claws 50.

In the embodiment described above, the base 10, the arm shafts 16L, 16R, the top plate 14, and the post 32 form a supporting structure. The roller shaft 17, the first roller 18, and the second roller 31 form the first drive section. The lever 22, the cam shaft 21, the arm drive cam 25, and the first roller 18 form a motion input mechanism. The second roller 31 and the cam surface 30 form a coupling mechanism. The present invention, however, is not restricted to the embodiment described above, and various different implementations are possible. For example, in the chuck device 5, it is possible to have multiple vertically arranged levels of chuck claws 50. Two or more pairs of arms 15L, 15R can be provided in vertically arranged levels, with one or more chuck claws being attached to each arm. When multiple vertically arranged levels of the chuck claws 50 are to be provided, it is preferable to optimize the shape of the grasping sections 51 of the chuck claws 50 to match the shape of the bottle BT where it will be grasped by the chuck claws 50. It is also possible to provide a freely rotatable roller at the inner side of the chuck claws 50, thus allowing the bottle BT to spin while being grasped by the chuck claws 50 by way of the roller. This type of structure is suited for cases such as when the bottle BT is to be rotated during the inspection step.

The biasing mechanism for the arms 15L, 15R is not restricted to the coil springs 33, 35, and other structures can be used. FIG. 16 through FIG. 20 show another embodiment in which a different biasing mechanism is sued. Elements that are the same as those from the embodiment shown in FIG. 1 through FIG. 15 are assigned like numerals and corresponding descriptions are omitted.

In the embodiment shown in FIG. 16 through FIG. 20, the pair of arm shafts 16L, 16R project upward from the top plate 14. To the outer perimeter of the projected sections 16a are fitted torsion coil springs 55, serving as a biasing mechanism, by way of bushes 16b. The upper ends of the arm shafts 16L, 16R are connected to each other by way of a connecting plate 56 and bolts 57. On the lower surface side of the connecting plate 56, a block 58 used as a spring peg is secured with a bolt 58a. The tightening force from the bolts 57 is received by the top plate 14 by way of the bushes 16b, and this results in the arm shafts 16L, 16R being supported between the top plate 14 and base 10, serving as a supporting structure.

Figure 18:
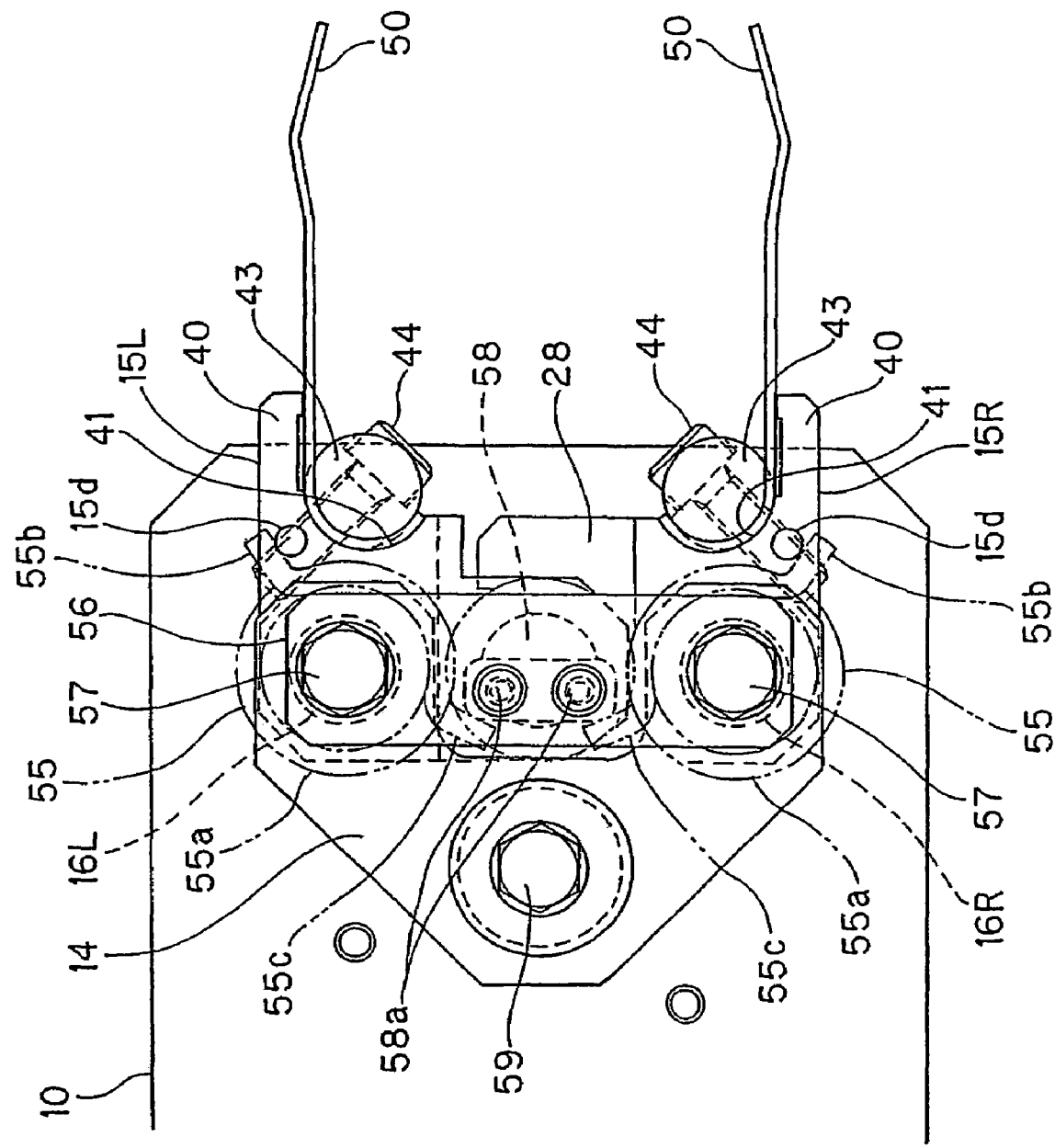
FIG. 18 is a plan drawing of a chuck device from FIG. 16.
Figure 19:
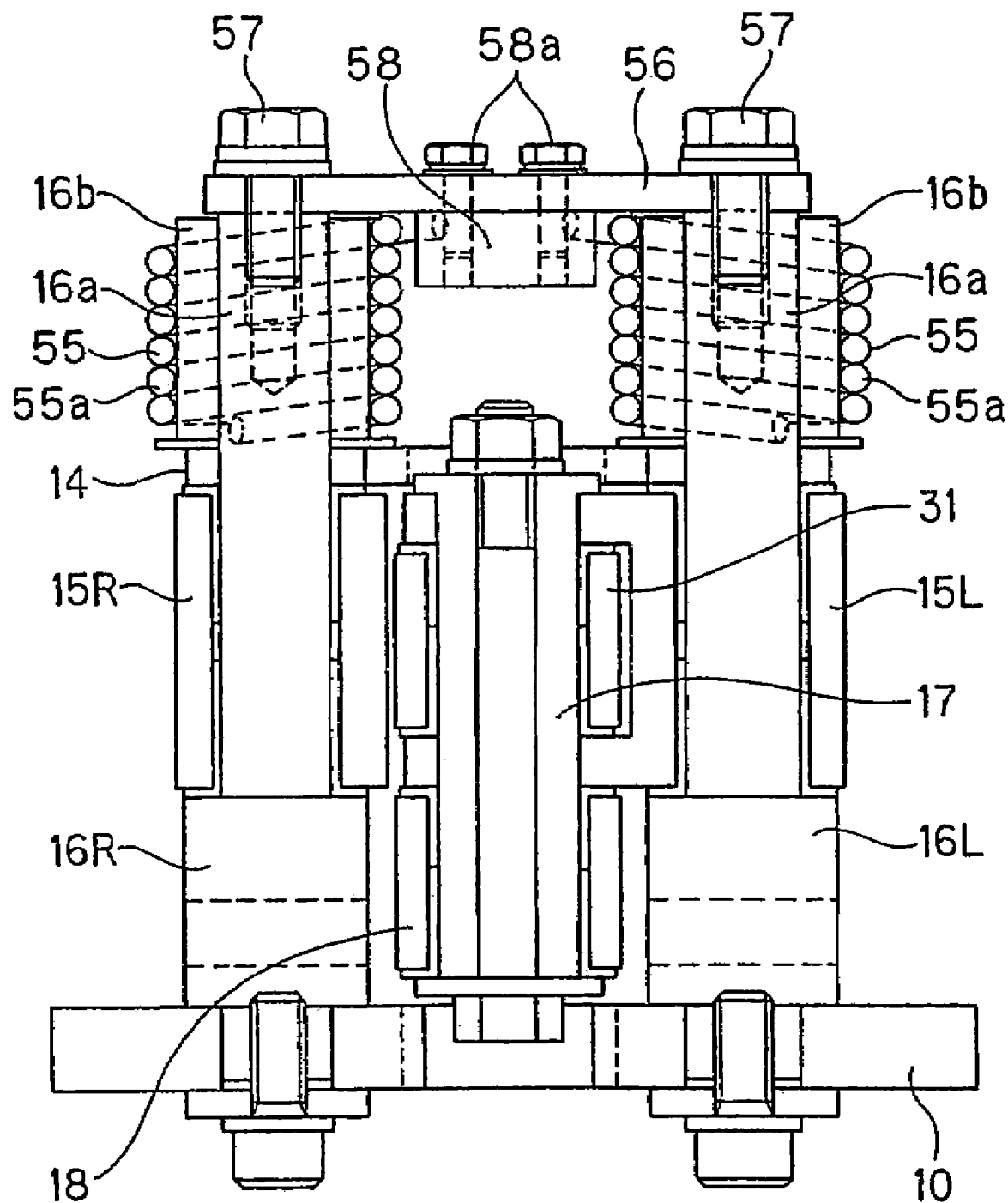
FIG. 19 is a cross-section drawing along the line XIX-XIX from FIG. 16.

As shown in FIG. 18 and FIG. 19, a pair of arms 55b, 55c are mounted on each arm shaft 16L, 16R by hooking one arm 55c to the block 58 and the other arm 55b to pins 15d disposed on the arms 15L, 15R while keeping the pair of arms 55b, 55c slightly open. The opening up of the arms 55b, 55c causes the elastic restoring force generated in a coil section 55a to bias the arms 55b, 55c toward each other (indicated by the arrow A in FIG. 17), and this results in the arms 15L, 15R also being biased in the direction that closes the chuck claws 50.

By using the torsion coil spring 55 as a biasing mechanism in this manner, there is no need to extend the arms 15L, 15R behind the arm shafts 16L, 16R or to provide the spring bearing hole 15a (FIG. 9) or the spring bearings 15b, 15c (FIG. 3) for the coil springs 33, 35. Thus, the rear ends of the arms 15L, 15R only extend to where they fit the arm shafts 16L, 16R, and the post 32 is eliminated is as well. As a result, the shape of the arms 15L, 15R is simplified and the number of parts is reduced. As FIG. 19 shows, the torsion coil spring is arranged symmetrically relative to the reference line CL. Thus, the arms 15L, 15R can be biased symmetrically, and the symmetry of their operations can be improved.

Figure 16:
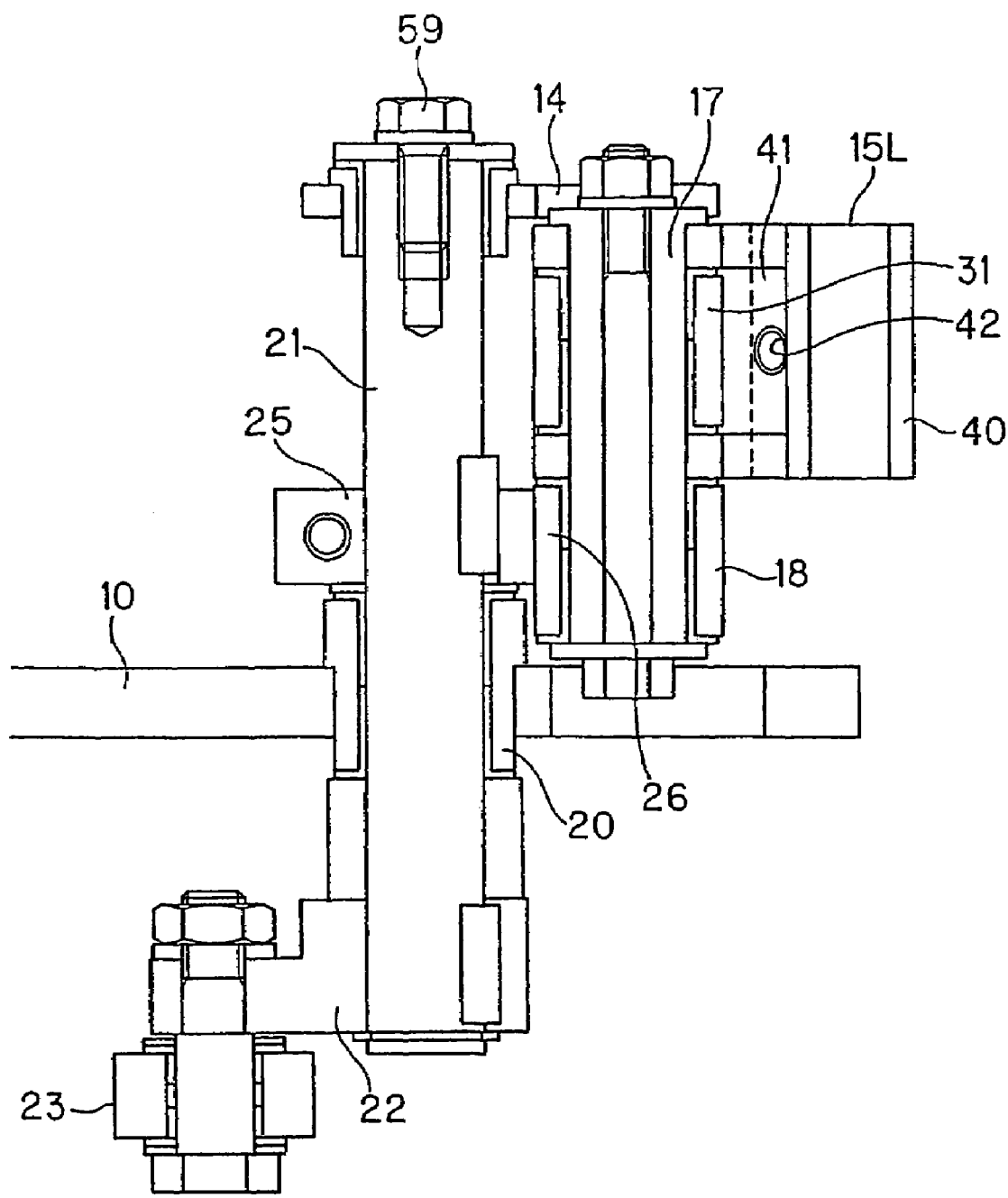
FIG. 16 is a cross-section drawing along an arm shaft in another embodiment that uses a torsion coil spring as a biasing mechanism.
Figure 17:
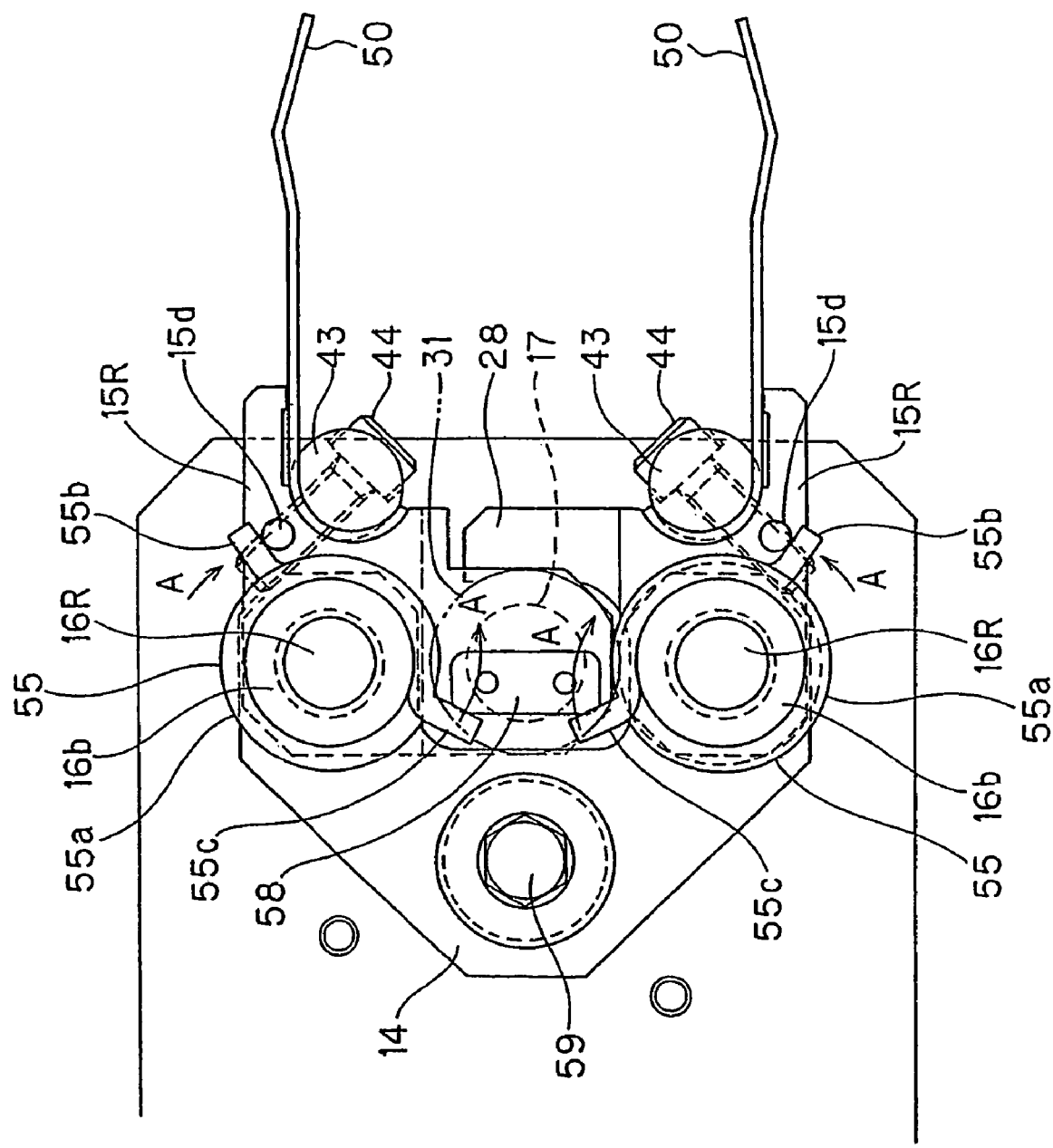
FIG. 17 is a drawing showing a chuck device as seen from arrow XVII in FIG. 16.
Figure 20:
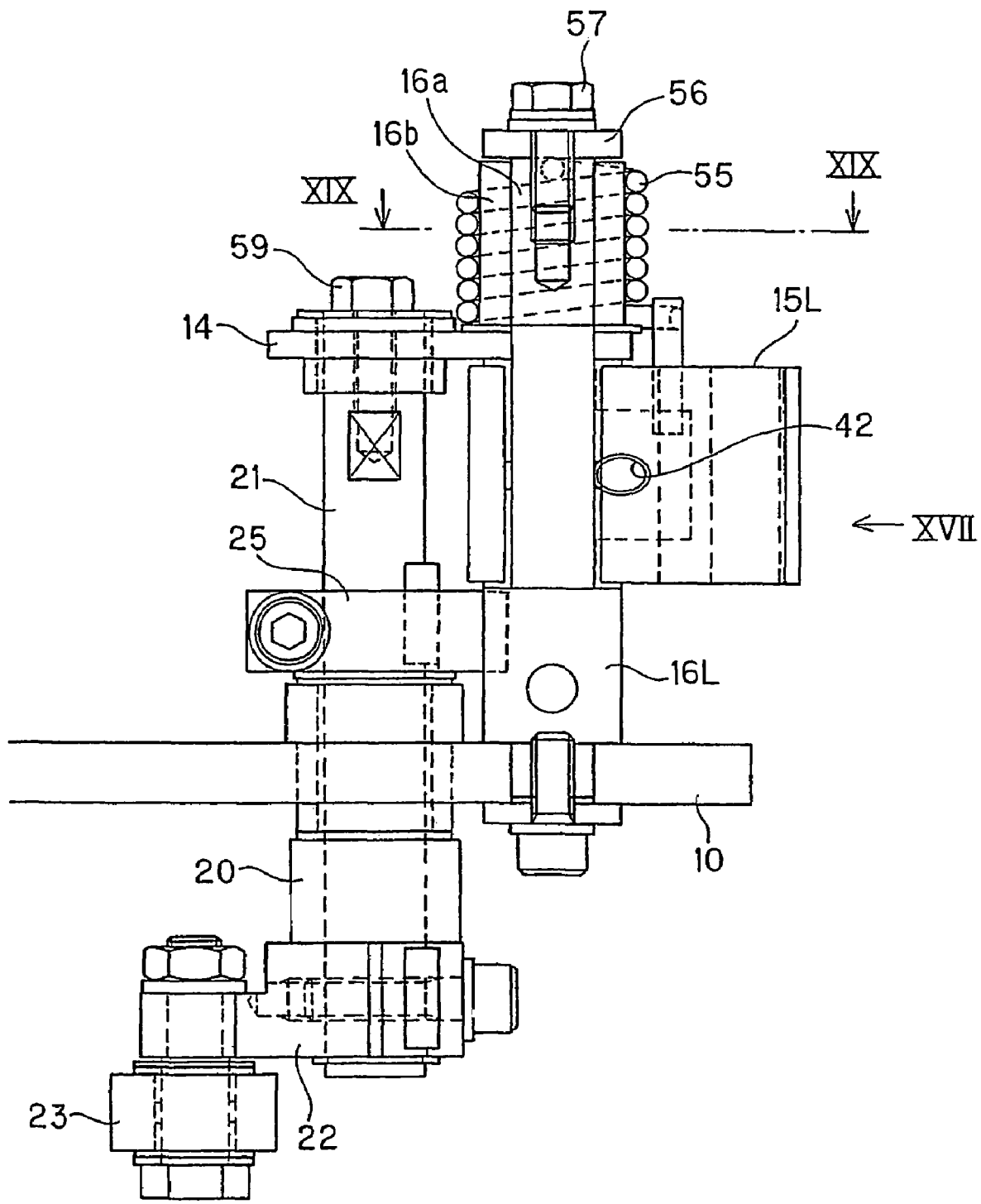
FIG. 20 is a cross-section drawing of the chuck device from FIG. 16 corresponding to the view in FIG. 5.

As FIG. 16, FIG. 19, and FIG. 20 show, the shortening of the arms 15L, 15R and the elimination of the post 32 and the coil springs 33, 35 creates space behind the roller shaft 17. The cam shaft 21 is extended upward to fill this space. The upper end of the cam shaft 21 is connected to the top plate 14 using a bolt 59. As a result, both ends of the cam shaft 21 are supported, and flexure of the cam shaft 21 can be restricted more than in the structure shown in FIG. 5.

Figure 21:
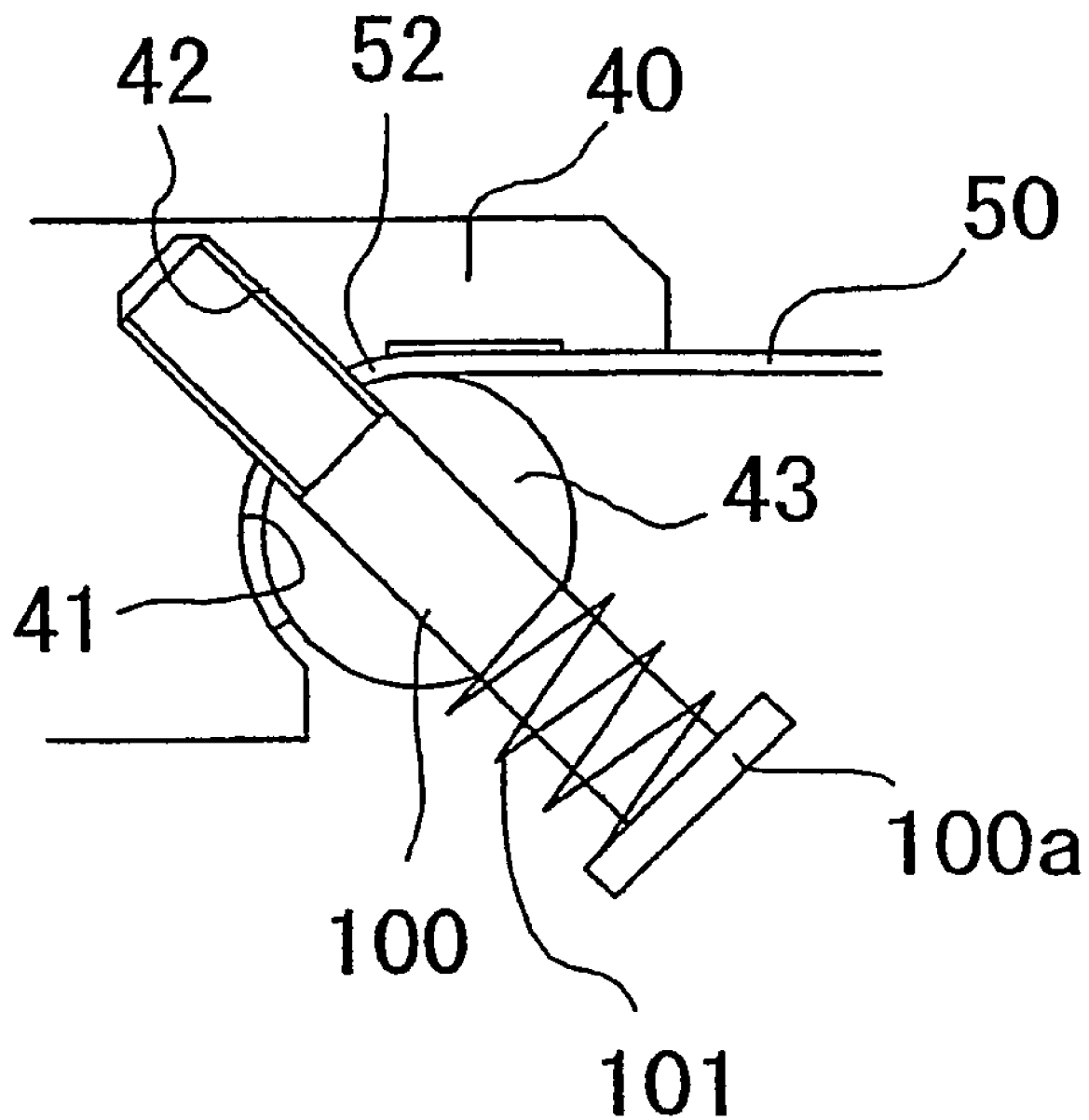
FIG. 21 is a drawing showing another example of a tightening mechanism for a support piece.

Although the embodiments above use a bolt as a tightening mechanism, tightening means is not restricted to this. For example, as shown in FIG. 21, a rod 100 can be mounted using the threaded hole 42, and a spring 101 can be attached in a compressed state between an enlarged section 100a and the support piece 43. This allows the rod 100 and the spring 101 to be used as a tightening mechanism.

The chuck device of the present invention is suitable for use with a star wheel device, but the present invention is not restricted to this and can be used in different types of conveyor devices in which containers need to be grasped. Also, the chuck device of the present invention is not restricted to a structure in which a pair of arms is opened and closed to grasp an object such as a container. The present invention can use different types of chuck devices. For example, instead of or in addition to having arms open and close, it is also possible to have a chuck device with arms that slide to perform a grasping action. Chuck claws can be attached to the arms according to the present invention in this case as well. The attaching of the chuck claw to the arm according to the present invention can be implemented for cases where a single arm performs a grasping action as well.

With the first chuck device and conveyor device according to the present invention as described above, the motion of an operation member is first transmitted from a first drive section to an arm, the arm is rotated, and this rotation is transmitted to a second drive section by way of a coupling mechanism. By changing the modes in which motion is converted, the degree of freedom for the operations of the arms can be increased. Also, since everything from the operation member to each of the arms is formed from mechanical mechanisms, the operations are precise and reliable and higher conveyor speeds can be handled. Furthermore, by using cam mechanisms for the motion input mechanism and the coupling mechanism simplifies the structure and provides further improvements in reliability.

Also, with the second chuck device and conveyor device according to the present invention, simply manipulating a tightening mechanism, e.g., a bolt, allows the chuck claws to be attached and removed and also prevents the chuck claws from rotating. Thus, the chuck claws can be easily attached and removed. In particular, with conveyor devices that use multiple chuck devices, the number of steps involved in attaching and removing the chuck claws can be significantly reduced.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A chuck device for containers comprising:
a supporting structure;
a pair of arms rotatably supported on said supporting structure by way of a pair of arm shafts, chuck claws for grasping a container being disposed on ends of said pair of arms that open and close in tandem with a rotation around said arm shafts; and
an operation member capable of being externally operated; wherein:
inward from said pair of arms is disposed a first drive section capable of integrally rotating around said arm shaft of a first arm and being integral with said first arm, and a second drive section disposed further toward said end of said arm than said first drive section and capable of rotating integrally around said arm shaft of a second arm and being integral with said second arm;
a biasing mechanism which biases said pair of arms around said arm shafts in a direction of closing said ends of said arms;
a motion input mechanism disposed between said operation member and said first drive section which converts motion accompanying external operation of said operation member to a rotation motion of said first drive section centered around said arm shaft; and
a coupling mechanism disposed between said first drive section and said second drive section which converts rotational motion of said drive section around said arm shaft to a rotational motion of said second drive section around said arm shaft.

2. A chuck device as described in claim 1 wherein said motion input mechanism comprises a cam mechanism to convert a motion of said operation member to rotation motion of said first drive section.

3. A chuck device as described in claim 2 wherein:
said cam mechanism of said motion input mechanism is equipped with an arm drive cam supported by said support structure to allow rotation around a cam axis line parallel to said arm shaft, a cam surface being formed on an outer perimeter of said arm drive cam;
said arm drive cam being disposed opposite from said second drive section relative to said first drive section;
such that said arm drive cam being rotated by operation of said operation member from outside;
as said arm drive cam rotates, said cam surface of said arm drive cam moves back and forth between a position where said first drive section is pushed out toward said second drive section and a position where said first drive section is retracted to an opposite side from said second drive section.

4. A chuck device as described in claim 3 wherein a first roller that comes into contact with said cam surface of said arm drive cam is disposed on said first drive section.

5. A chuck device as described in claim 3 wherein:
a roller shaft parallel to said arm shaft is disposed on said first drive section; and
on said roller shaft, there is disposed a first roller coming into contact with said cam surface of said arm drive cam, and a second roller coming into contact with said second drive section.

6. A chuck device as described in claim 3 wherein a support section is disposed on said cam surface of said arm drive cam to support said first drive section at said position pushed out toward said second drive section.

7. A chuck device as described in claim 3 wherein:
said biasing mechanism includes, torsion coil springs disposed on each of said pair of arm shafts to bias said pair of arms so that said ends are biased in a closing direction; and
both ends of a cam shaft rotatably supporting said pair of arm shafts and said arm drive cam are supported by said supporting structure.

8. A chuck device as described in claim 1 wherein said coupling mechanism comprises a cam mechanism to convert rotation motion of said first drive section to rotation motion of said second drive section.

9. A chuck device as described in claim 8 wherein said cam mechanism of said coupling mechanism is equipped with a cam surface disposed on said second drive section and coming into contact with said first drive section.

10. A chuck device as described in claim 1 wherein said biasing mechanism includes a spring disposed between said support structure and said second arm and biasing said second arm so that said chuck claws are biased in a closing direction.

11. A chuck device as described in claim 1 wherein said biasing mechanism includes torsion coil springs on each of said pair of arm shafts to bias said pair of arms so that said ends are biased in a closing direction.

12. In a chuck device wherein a chuck claw is removably mounted on an end of an arm driven to perform a grasping action,
a chuck device wherein:
a cylindrically indented bearing surface is disposed on said arm;
a holding piece equipped with a cylindrical outer perimeter surface curved along said bearing surface is disposed on said bearing surface using a bolt;
a chuck bearing is disposed on said arm to receive reaction generated on said chuck claw during said grasping action;
said bearing surface is formed to connect with a side of said chuck bearing section that comes into contact with said chuck claw;
said bolt is set up to attach to said bearing surface in such a direction that, going toward a rear end of said arm, said bolt extends from said bearing surface toward a back surface relative to a side of said arm in contact with said chuck claw; and
an attachment base curved along said bearing surface and capable of being inserted between said support piece and said bearing surface disposed on said chuck claw.

13. In a chuck device wherein a chuck claw is removably mounted on an end of an arm driven to perform a grasping action,
a chuck device wherein:
a cylindrically indented bearing surface is disposed on said arm;
a holding piece equipped with a cylindrical outer perimeter surface curved along said bearing surface is disposed on said bearing surface using a bolt;
a chuck bearing is disposed on said arm to receive reaction generated on said chuck claw during said grasping action;
said bearing surface is formed to connect with a side of said chuck bearing section that comes into contact with said chuck claw;
said bolt is set up to attach to said bearing surface in such a direction that, going toward a rear end of said arm, said bolt extends from said bearing surface toward a back surface relative to a side of said arm in contact with said chuck claw; and an attachment base curved along said bearing surface and capable of being inserted between said support piece and said bearing surface disposed on said chuck claw;

a slit is formed on said attachment base of said chuck claw to allow said bolt to pass through;

an arm shaft rotatably supporting said arm is disposed behind said bearing surface; and said bolt is screwed in between said bearing surface and said arm shaft.

* * * * *